United States Patent
Lee

(10) Patent No.: US 11,717,756 B2
(45) Date of Patent: Aug. 8, 2023

(54) CONTENT, ORCHESTRATION, MANAGEMENT AND PROGRAMMING SYSTEM

(71) Applicants: Sony Group Corporation, Tokyo (JP); Sony Corporation of America, New York, NY (US)

(72) Inventor: David Lee, Norwalk, CA (US)

(73) Assignees: Sony Group Corporation, Tokyo (JP); Sony Corporation of America, New York, NY (US)

(*) Notice: Subject to any disclaimer, the term of this patent is extended or adjusted under 35 U.S.C. 154(b) by 128 days.

(21) Appl. No.: 17/469,725

(22) Filed: Sep. 8, 2021

(65) Prior Publication Data

US 2022/0080319 A1   Mar. 17, 2022

Related U.S. Application Data

(60) Provisional application No. 63/077,414, filed on Sep. 11, 2020.

(51) Int. Cl.
*A63F 13/65* (2014.01)
*A63F 13/52* (2014.01)
*A63F 13/352* (2014.01)

(52) U.S. Cl.
CPC ............ *A63F 13/65* (2014.09); *A63F 13/352* (2014.09); *A63F 13/52* (2014.09); *A63F 2300/6018* (2013.01); *A63F 2300/8047* (2013.01)

(58) Field of Classification Search
CPC ........ A63F 13/65; A63F 13/352; A63F 13/52; A63F 13/355; A63F 13/792; A63F 13/44; A63F 13/54; A63F 13/814; A63F 2300/6018; A63F 2300/8047
See application file for complete search history.

(56) References Cited

U.S. PATENT DOCUMENTS

| | | | |
|---|---|---|---|
| 6,961,055 B2* | 11/2005 | Doak | A63F 13/52 345/677 |
| 8,990,140 B2* | 3/2015 | Michelstein | G06F 16/285 706/47 |
| 9,009,092 B2* | 4/2015 | Michelstein | G06F 16/34 706/45 |

(Continued)

OTHER PUBLICATIONS

Waihi, Joshua. "What Are the Benefits of a Headless CMS?" Published Aug. 22, 2022. Acquia. Accessed Mar. 10, 2023. 7 pages. <https://www.acquia.com/blog/benefits-of-headless-cms#:~:text=A%20headless%20CMS%20makes%20it,republishing%20content%20in%20multiple%20places.> (Year: 2022).*

(Continued)

*Primary Examiner* — William H McCulloch, Jr.
(74) *Attorney, Agent, or Firm* — Procopio, Cory, Hargreaves & Savitch LLP

(57) ABSTRACT

Procedurally generating live experiences for a virtualized music-themed world, including: providing a headless content management system supporting management of back end; coupling a virtual world client to the back end of the content management system using an interface that provides a content packaging framework to enable customized event scheduling and destination management; and procedurally generating a plurality of content elements in a real-time game engine for live experiences in the virtualized music-themed world.

18 Claims, 25 Drawing Sheets

(56) References Cited

U.S. PATENT DOCUMENTS

| | | | |
|---|---|---|---|
| 9,208,216 B2* | 12/2015 | Michelstein | G06F 16/285 |
| 9,503,770 B2 | 11/2016 | Elm et al. | |
| 10,666,997 B2 | 5/2020 | Roberts et al. | |
| 11,452,940 B2* | 9/2022 | Baughman | A63F 13/215 |
| 2003/0058238 A1* | 3/2003 | Doak | G06T 19/00 |
| | | | 709/217 |
| 2006/0111188 A1 | 5/2006 | Winkler | |
| 2009/0253517 A1* | 10/2009 | Bererton | A63F 13/63 |
| | | | 463/43 |
| 2010/0304869 A1 | 12/2010 | Lee et al. | |
| 2012/0150577 A1* | 6/2012 | Berg | G06Q 10/0631 |
| | | | 705/342 |
| 2013/0332475 A1* | 12/2013 | Michelstein | G06F 16/288 |
| | | | 707/756 |
| 2014/0025619 A1* | 1/2014 | Michelstein | G06F 40/151 |
| | | | 706/47 |
| 2014/0025650 A1* | 1/2014 | Lee | G06F 40/103 |
| | | | 707/694 |
| 2014/0067958 A1 | 3/2014 | Bradley et al. | |
| 2015/0178376 A1* | 6/2015 | Michelstein | G06F 16/288 |
| | | | 707/756 |
| 2015/0199605 A1* | 7/2015 | Michelstein | G06F 40/103 |
| | | | 706/47 |
| 2016/0085786 A1* | 3/2016 | Michelstein Halberstam | |
| | | | G06F 16/9535 |
| | | | 707/756 |
| 2021/0379492 A1* | 12/2021 | Baughman | A63F 13/352 |
| 2022/0075591 A1* | 3/2022 | Cardenas Gasca | A63F 13/213 |
| 2022/0080319 A1* | 3/2022 | Lee | A63F 13/65 |
| 2022/0080320 A1* | 3/2022 | Sachson | A63F 13/65 |
| 2023/0071892 A1* | 3/2023 | Liang | A63F 13/54 |

OTHER PUBLICATIONS

International Search Report in PCT/US2021/049711, dated Nov. 11, 2021, p. 2, ISA/RU.

R. Ranjan, et al., "MediaWiseCloud Content Orchestrator", Journal of Internet Services and Applications, Jan. 2013, 14 pages.

* cited by examiner

Add Attribute

Name
[Volumetric Video]

UE4 Attribute Name
[video01]

Type
[video/url ▼]

Resource
[http://cdn.monterey.com/beer_vol.mov]

☐ Deactivate this attribute type

[Save Attribute] [Cancel]

Add functionality is similar to Edit

Based on Attribute type, additional UI screens will appear to:
- Pull playlab item lists
- Pull Napster playlists
- Upload audio, video, image, etc.

FIG. 22

CONTENT, ORCHESTRATION, MANAGEMENT AND PROGRAMMING SYSTEM

CROSS-REFERENCE TO RELATED APPLICATIONS

This application claims the benefit of priority under 35 U.S.C. § 119(e) of U.S. Provisional Patent Application No. 63/077,414, filed Sep. 11, 2020, entitled "Content Orchestration, Management and Programming System". The disclosure of the above-referenced application is incorporated herein by reference.

BACKGROUND

Field

The present disclosure relates to content management, and more specifically, to back-end content management for a virtual music-themed world.

Background

Computer-implemented games such as PC, gaming console, table, mobile phone, or any other analogous device-based games are increasingly popular, and new uses for the technology are constantly being found. The software may also be tied to certain real or virtual-world systems. However, since the content of the games are in the executable, when something in the game needs to be changed, a large amount of content including binaries needs to be downloaded again.

SUMMARY

The present disclosure provides for leveraging the content management system in a social metaverse where content is procedurally generating live experiences in a real-time 3-D game engine for a virtualized music-themed world.

In one implementation, a method for procedurally generating live experiences for a virtualized music-themed world is disclosed. The method includes: providing a headless content management system supporting management of back end; coupling a virtual world client to the back end of the content management system using an interface that provides a content packaging framework to enable customized event scheduling and destination management; and procedurally generating a plurality of content elements in a real-time game engine for live experiences in the virtualized music-themed world.

In one implementation, procedurally generating includes providing a server-side control over how the plurality of content elements is rendered. In one implementation, the server-side control comprises control over what content element is rendered. In one implementation, the server-side control comprises control over where the content element is rendered. In one implementation, the server-side control comprises control over when the content element is rendered and for how long. In one implementation, the server-side control comprises control over what the content element costs. In one implementation, the method further includes rendering the plurality of content elements from at least one of text, audio, music, and video source files at specific choreographed times within a virtual setting.

In another implementation, a system for procedurally generating live experiences for a 3-D virtualized music world is disclosed. The system includes: a headless content management system to provide management of a back end; and a virtual world client to connect to the back end using an interface that provides a content packaging framework to enable customized event scheduling and destination management, wherein the virtual-world client procedurally generates a plurality of content elements in a real-time game engine for live experiences in a virtualized music-themed world.

In one implementation, the virtual-world client includes a server-side controller which provides server-side control over how the plurality of content elements is rendered. In one implementation, the server-side control comprises control over which content element of the plurality of content elements is rendered. In one implementation, the server-side control comprises control over where the content element is rendered. In one implementation, the server-side control comprises control over when the content element is rendered and for how long. In one implementation, the server-side control comprises control over what the content element costs. In one implementation, the virtual-world client renders the plurality of content elements from at least one of text, audio, music, and video source files at specific choreographed times within a virtual setting.

In another implementation, a non-transitory computer-readable storage medium storing a computer program to procedurally generate live experiences for a virtualized music-themed world is disclosed. The computer program includes executable instructions that cause a computer to: provide a headless content management system supporting management of back end; couple a virtual world client to the back end of the content management system using an interface that provides a content packaging framework to enable customized event scheduling and destination management; and procedurally generate a plurality of content elements in a real-time game engine for live experiences in the virtualized music-themed world.

In one implementation, the executable instructions that cause the computer to procedurally generate includes executable instructions that cause the computer to provide a server-side control over how the plurality of content elements is rendered. In one implementation, the server-side control comprises control over what content element is rendered. In one implementation, the non-transitory computer-readable storage medium further includes executable instructions that cause the computer to render the plurality of content elements from at least one of text, audio, music, and video source files at specific choreographed times within a virtual setting.

Other features and advantages should be apparent from the present description which illustrates, by way of example, aspects of the disclosure.

BRIEF DESCRIPTION OF THE DRAWINGS

The details of the present disclosure, both as to its structure and operation, may be gleaned in part by study of the appended drawings, in which like reference numerals refer to like parts, and in which:

FIG. 11 shows All Schedules page;

FIG. 18 shows All Attribute Types page;

FIG. 20 shows All Venues page;

FIG. 22 shows Add Content Attributes page;

DETAILED DESCRIPTION

Figure 1:
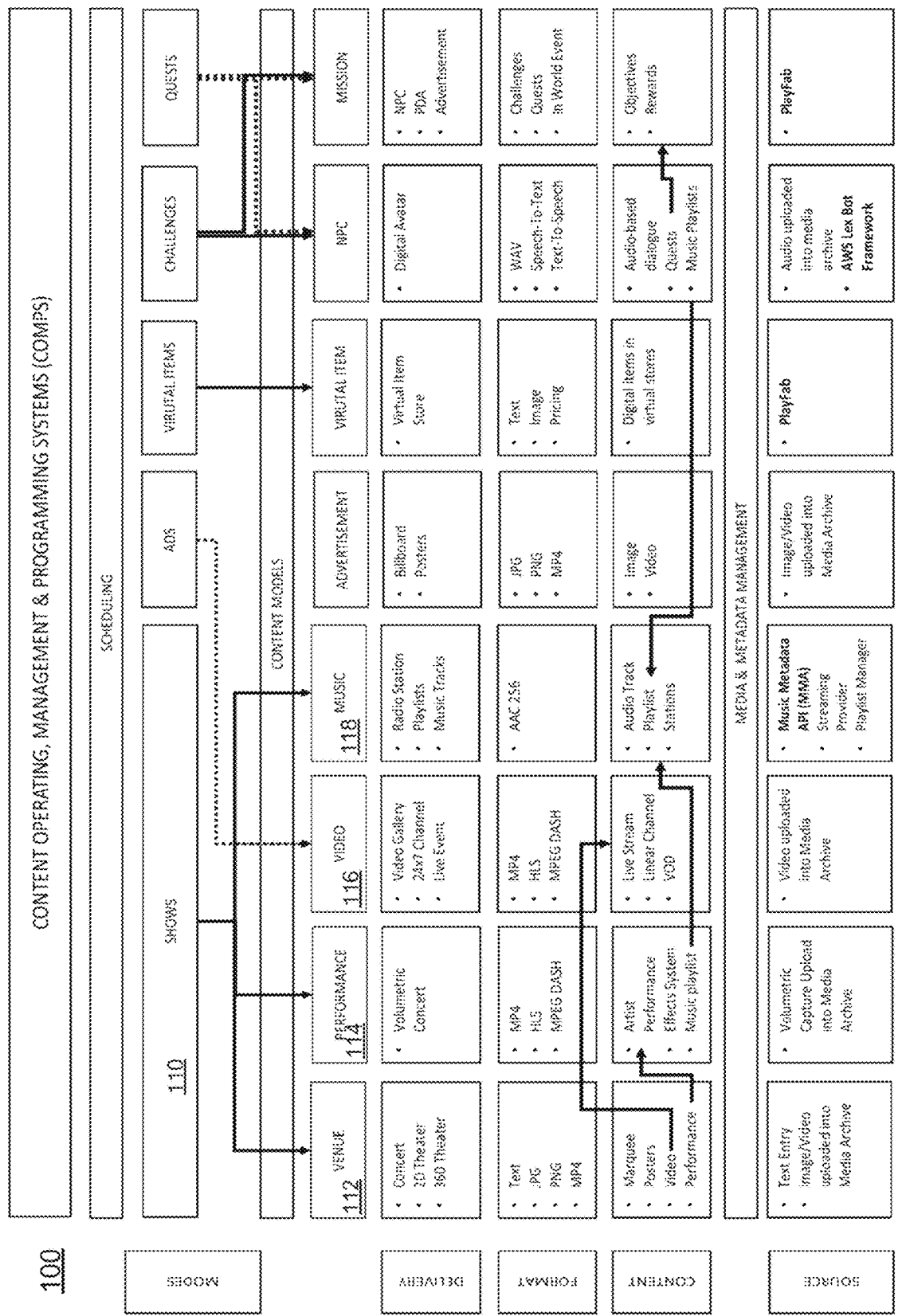
FIG. 1 is a diagram of a scheduling layer operating within a content operating, management and programming (COMP) system in accordance with one implementation of the present disclosure.

As described above, computer-implemented games residing in relevant gaming device systems, such as those referred to above, are increasingly popular, and new uses for the technology are constantly being found. The software may also be tied to certain virtualized music world systems. However, since the content of the games are in the executable, when something in the game needs to be changed, a large amount of content including binaries needs to be downloaded again. Accordingly, a need exists for more efficient real-time rendering of the virtual music-themed world.

Certain implementations of the present disclosure provide for leveraging the content management system in a social metaverse where content is procedurally generating live experiences in a real-time 3-D game engine for a virtualized music-themed world. That is, the procedural generation of the content (i.e., orchestration of multiple content elements) in the content management system of the present disclosure enables the content to be updated and rendered dynamically by leveraging the content management system. After reading below descriptions, it will become apparent how to implement the disclosure in various implementations and applications. Although various implementations of the present disclosure will be described herein, it is understood that these implementations are presented by way of example only, and not limitation. As such, the detailed description of various implementations should not be construed to limit the scope or breadth of the present disclosure.

In one implementation, a computer system provides a headless content management system, supporting back-end management without providing a front end for data presentation. The computer system provides designing and implementing content orchestration, management, and programming in a virtual music-themed world by providing a mechanism for real-time procedural virtual world generation. In one example, a virtual world client connects to the content orchestration, management, and programming back end through a GraphQL interface that provides a content packaging framework to enable customized and efficient event scheduling and destination management. The GraphQL interface is neither the front end nor the back end, but rather it is a language spoken between the back end and the front end to exchange information.

Features provided in implementations can include, but are not limited to, one or more of the following items: Server-side control over one or more of: (a) what content appears; (b) where content appears; (c) when content appears (and for how long); and (d) what content costs. Using this information, the client can render out various content from text, audio, music, and video source files at specific choreographed times within a virtual setting (e.g., a virtual concert venue). Content producers may define content packs and program event schedules through a web interface where data is stored in both a relational database and in a cache with programming in Java that uses reflection to define content models.

FIG. 1 is a diagram of a scheduling layer operating within a content operating, management and programming (COMP) system 100 in accordance with one implementation of the present disclosure. In one example, when shows 110 are scheduled, there are metadata under shows 110 that describes what makes a show possible, such as which venue 112, what performance 114 (e.g., Singer1), what kind of video 116 and music 118. Once a show is scheduled, the COMP system procedurally generates, renders, and performs the show.

Figure 2:
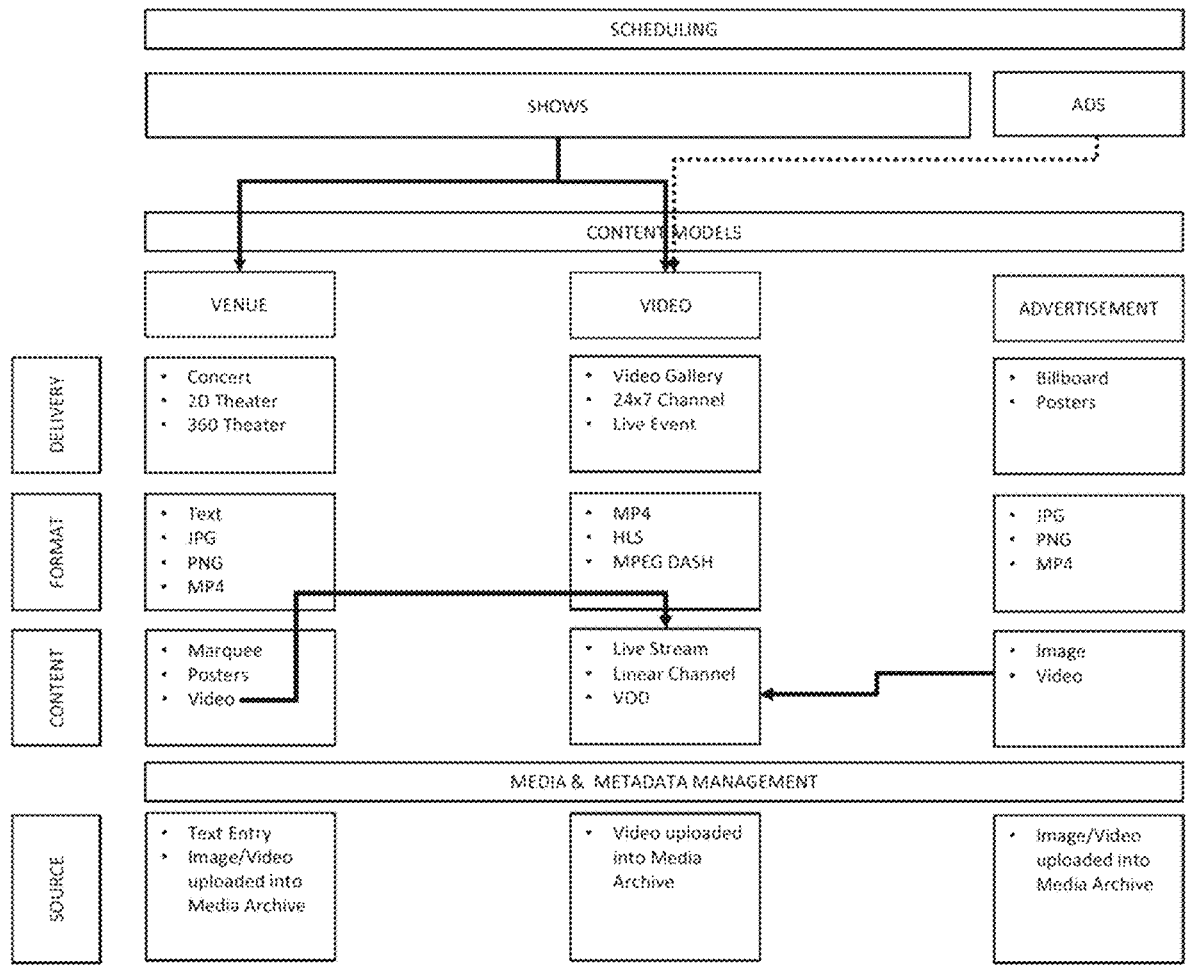
FIG. 2 is an example of metadata that is stored and managed under the content models and media/metadata management.

FIG. 2 is an example of metadata that is stored and managed under the content models and media/metadata management.

Figure 3:
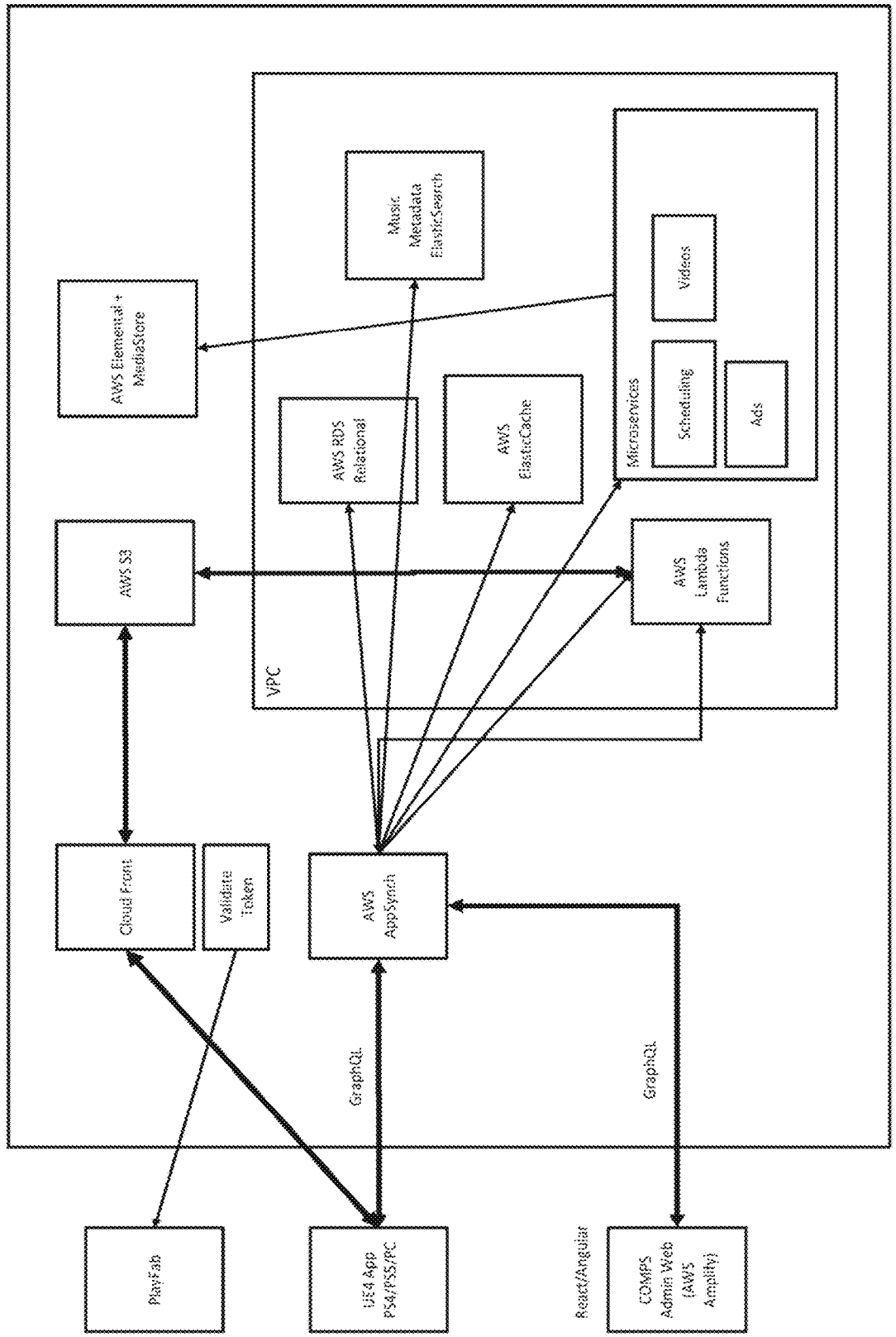
FIG. 3 is a block diagram of the architecture and design of the COMP system in accordance with one implementation of the present disclosure.

FIG. 3 is a block diagram of the architecture and design 300 of the COMP system in accordance with one implementation of the present disclosure. In one implementation, the architecture and design 300 of the COMP system shows the details of the overall architecture, design, dependencies, and requirements to fulfill the product requirements.

Figure 4:
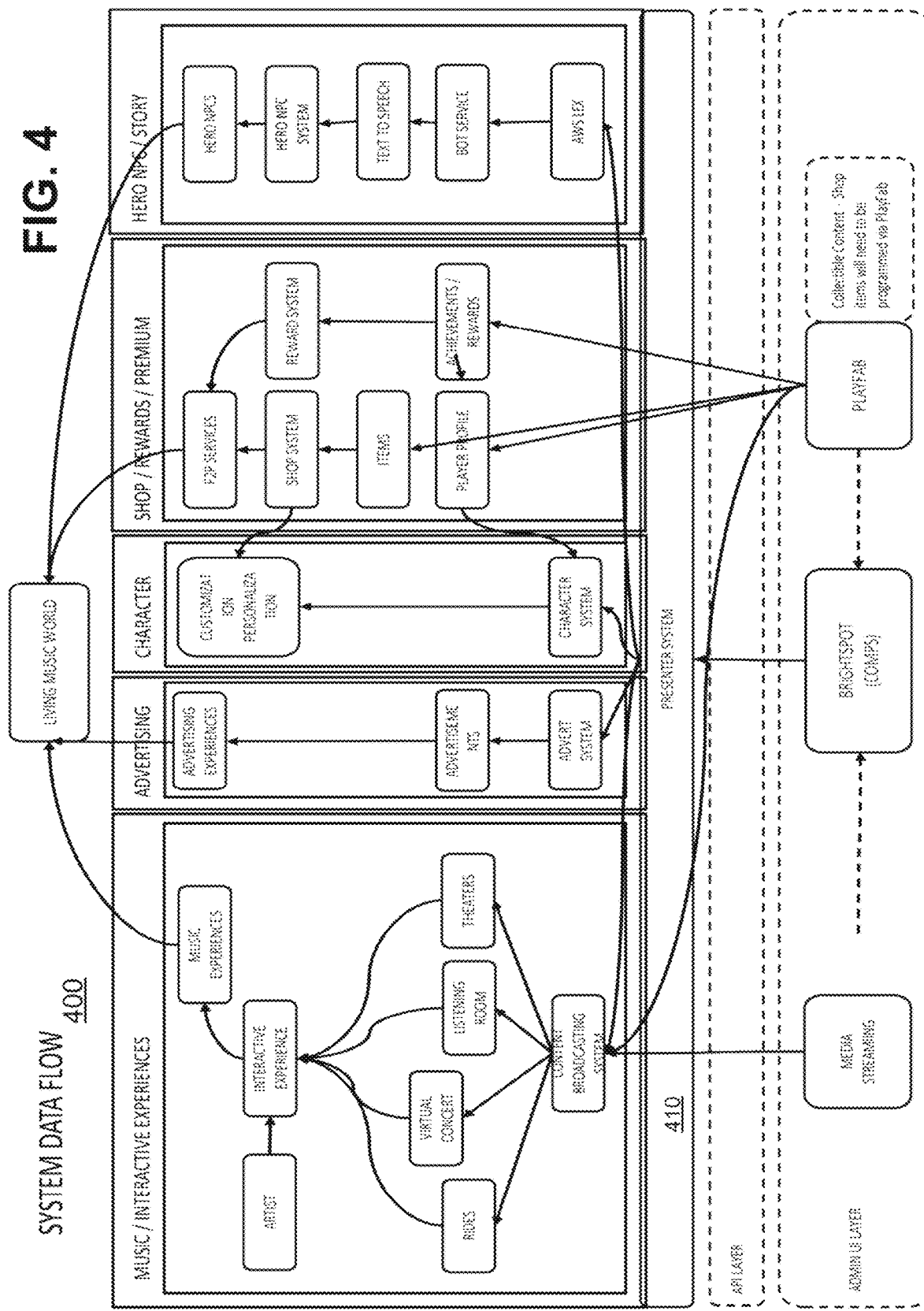
FIG. 4 is a system data flow diagram including a list of systems, subsystems and logical components and how the COMP system will interact with them.

FIG. 4 is a system data flow diagram 400 including a list of systems, subsystems and logical components and how the COMP system will interact with them. The data flow diagram 400 also includes a presenter system 410 which is a client-side/server-side system built in C++ on the Unreal Engine. The presenter system 410 is responsible for requesting programmed content data from the backend COMP system. Upon receiving the serialized data, the presenter system 410 deserializes and maps data to appropriate elements within the application. In one example, an item of audio is mapped to an Unreal Engine Audio Element. As the event's schedule begins, the event scheduler of the presenter system 410 notifies all clients to begin playing. That is, the presenter system 410 procedurally generates and activates the music artist's performance with audio, lights, effects and imagery.

Figure 5:
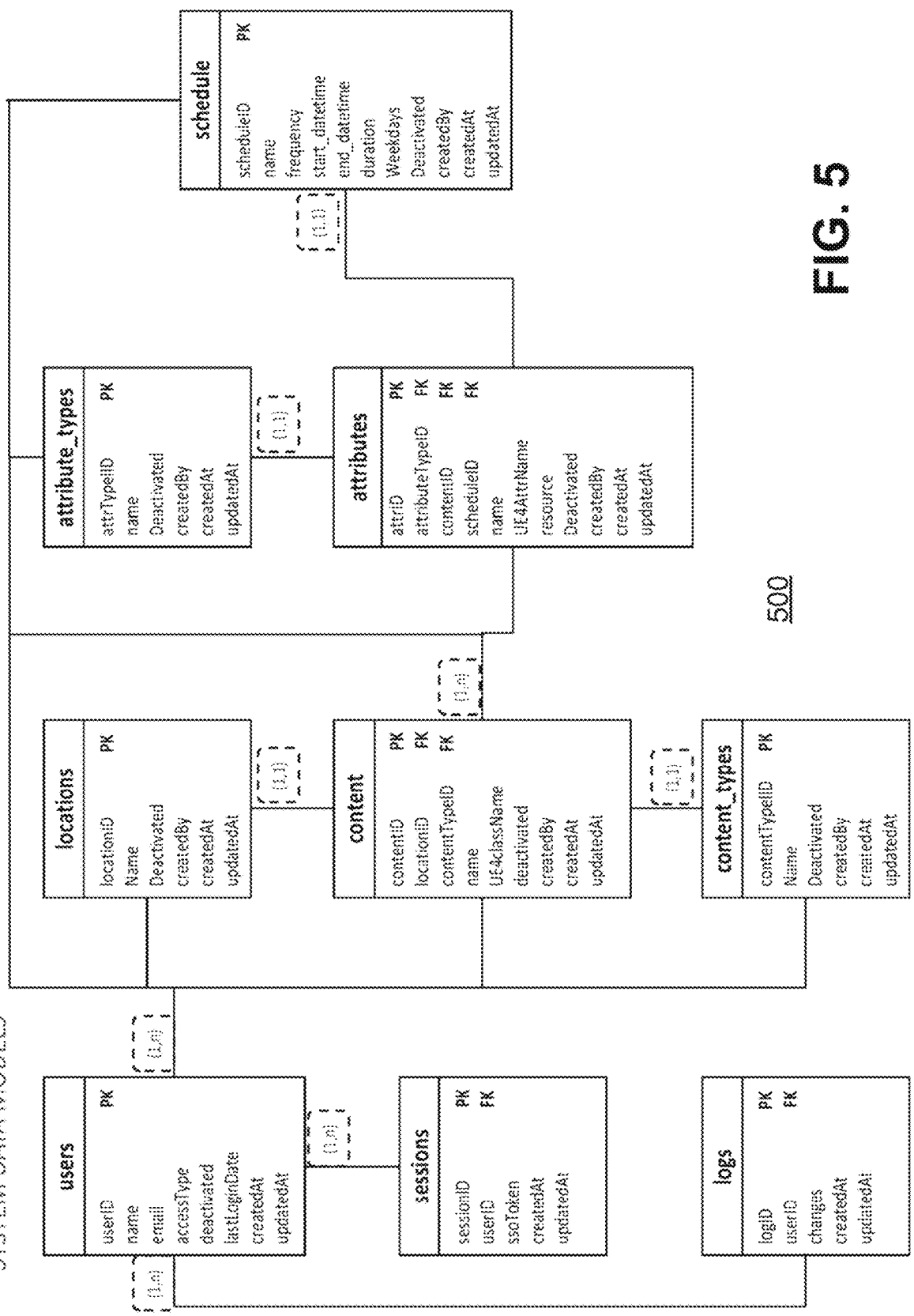
FIG. 5 is a data entity relationship diagram (ERD) in accordance with one implementation of the present disclosure.

FIG. 5 is a data entity relationship diagram (ERD) 500 in accordance with one implementation of the present disclosure. In the illustrated implementation of FIG. 5, the data ERD describes the database tables and entity relationships between tables. In one example, a show that is scheduled is referred to as an event. The ERD 500 describes the event as stored in the database. The below sections describe the database schema.

User (admin) Data Model: This table defines the list of privileged users who have access to view or administer content within the COMPS System.

| Attribute | Data Type | Required | Description | Potential Values |
|---|---|---|---|---|
| user_id | Integer | Y | Primary key | |
| name | String | Y | Used to display user name | First Name, Last Name |
| profile_image | String | N | Image of user which can be uploaded or pulled down from Azure AD | URL string to image file |
| email | Boolean | Y | Email to be used to authenticate | This email will be used to send an invite to user to validate their email |
| access_type | Integer | Y | Entitlement level | 0 = View-only or 1 = Admin |
| auth_type | Integer | Y | How the user will be authenticated into COMPS's web portal | Default: 0 = SSO Azure AD |
| deactivated | Boolean | Y | Is the object deactivated? | Default: false |
| last_login_date | datetime | N | Last time user logged in | the date-time notation as defined by RFC 3339, section 5.6, for example, 2017-07-21T17:32:28Z |
| created_at | datetime | Y | When the record was created | the date-time notation as defined by RFC 3339, section 5.6, for example, 2017-07-21T17:32:28Z |
| updated_at | datetime | Y | Last time the record was updated | the date-time notation as defined by RFC 3339, section 5.6, for example, 2017-07-21T17:32:28Z |

User Session Data Model: This table represents the active session for any user authenticated through Azure Active Directory (AD). The session will remain active unless expired whereby the user will need to re-authenticate using Single Sign-On (SSO).

| Attribute | Data Type | Required | Description | Potential Values |
|---|---|---|---|---|
| session_id | Integer | Y | Primary key | |
| user_id | Integer | Y | User ID Foreign key | |
| token | String | Y | Azure AD Session token | |
| created_at | datetime | Y | When the record was created | the date-time notation as defined by RFC 3339, section 5.6, for example, 2017-07-21T17:32:28Z |
| updated_at | datetime | Y | Last time the record was updated | the date-time notation as defined by RFC 3339, section 5.6, for example, 2017-07-21T17:32:28Z |

User Logs Data Model

This table represents all the logged user events such as but not limited to the following: Logging in; Creating content; and Changing a schedule.

| Attribute | Data | Required Type | Description | Potential Values |
|---|---|---|---|---|
| log_id | Integer | Y | Primary key | |
| user_id | Integer | Y | User ID Foreign key | |
| changes | String | Y | A textual description of what data the user changed in the COMPS system | Example: User A changed the schedule for Content A |
| created_at | datetime | Y | When the record was created | the date-time notation as defined by RFC 3339, section 5.6, for example, 2017-07-21T17:32:28Z |
| updated_at | datetime | Y | Last time the record was updated | the date-time notation as defined by RFC 3339, section 5.6, for example, 2017-07-21T17:32:28Z |

Content Location Data Model

This table represents where in the Music World content can be located.

| Attribute | Data Type | Required | Description | Potential Values |
|---|---|---|---|---|
| location_id | Integer | Y | Primary key | |
| name | String | Y | Display name for the location of the content in the Music World | Examples: "Hub", "Hip-Hop Alley" |
| deactivated | Boolean | Y | Is the object deactivated? | Default: false |
| created_by | Integer | Y | Foreign key of user who created this content | |
| created_at | datetime | Y | When the record was created | the date-time notation as defined by RFC 3339, section 5.6, for example, 2017-07-21T17:32:28Z |
| updated_at | datetime | Y | Last time the record was updated | the date-time notation as defined by RFC 3339, section 5.6, for example, 2017-07-21T17:32:28Z |

Content Type Data Model

This table represents the various types of content that COMPS and the UE4 client are designed for.

| Attribute | Data | Required Type | Description | Potential Values |
|---|---|---|---|---|
| content_type_id | Integer | Y | Primary key | |
| Mainname | String | Y | Category of content types that can be managed by COMPS. Each content type will enforce UI for related data attributes | Ad<br>NPC<br>Venue<br>Item<br>Playlist |
| deactivated | Boolean | Y | Is the object deactivated? | Default: false |
| created_by | Integer | Y | Foreign key of user who created this content | |
| created_at | datetime | Y | When the record was created | the date-time notation as defined by RFC 3339, section 5.6, for example, 2017-07-21T17:32:28Z |
| updated_at | datetime | Y | Last time the record was updated | the date-time notation as defined by RFC 3339, section 5.6, for example, 2017-07-21T17:32:28Z |

Content Data Model

This table represents the dynamic content in the Music World mapped to the parent UE4 object that contains attributes.

Design Consideration

In some cases, a piece of Music World content may contain a single attribute, however designing the data hierarchy where a single UE4 Object (content) can have many attributes provides flexibility as the Music World grows. For example, early on, the Music World may contain a theater showing a Singer1's video, however, in the future this same theater may contain exterior posters, a marquee and multiple theaters inside the building.

| Attribute | Data Type | Required | Description | Potential Values |
|---|---|---|---|---|
| content_id | Integer | Y | Primary key | |
| location_id | Integer | Y | Foreign key of location in Music world content will live | |
| name | String | Y | Display name for the content | Examples: "Madison Beer Concert", "ACDC T-Shirt" |
| ue4_class_name | String | Y | The actual UE4 class name representing this UObject in Unreal | Example: "theater01", "joe_npc" |
| created_by | Integer | Y | Foreign key of user who created this content | |
| deactivated | Boolean | Y | Is the object deactivated? | Default: false |
| created_at | datetime | Y | When the record was created | the date-time notation as defined by RFC 3339, section 5.6, for example, 2017-07-21T17:32:28Z |
| updated_at | datetime | Y | Last time the record was updated | the date-time notation as defined by RFC 3339, section 5.6, for example, 2017-07-21T17:32:28Z |

Attribute Type Data Model

The table represents the various types of data (audio, video, etc) of an attribute.

| Attribute | Data Type | Required | Description | Potential Values |
|---|---|---|---|---|
| attr_type_id | Integer | Y | Primary key | |
| name | String | Y | Category of attribute types that can be managed COMPS. Each type will provide details on where the resources can be located. | Following but not limited to: audio/url image/url video/url json/url text/text text/json playfab/url playfab/quest_name playfab/item_id napster/artist_id napster/playlist_id |
| deactivated | Boolean | Y | Is the object deactivated? | Default: false |
| created_by | Integer | Y | Foreign key of user who created this content | |
| created_at | datetime | Y | When the record was created | the date-time notation as defined by RFC 3339, section 5.6, for example, 2017-07-21T17:32:28Z |
| updated_at | datetime | Y | Last time the record was updated | the date-time notation as defined by RFC 3339, section 5.6, for example, 2017-07-21T17:32:28Z |

Content Attribute Data Model
This table references all the attribute and data resources that a single UE4 Object can contain.

| Attribute | Data Type | Required | Description | Potential Values |
|---|---|---|---|---|
| attribute_id | Integer | Y | Primary Key | |
| attribute_type_id | Integer | Y | Foreign Key | |
| content_id | Integer | Y | Foreign Key | |
| schedule_id | Integer | Y | Foreign Key | |
| name | String | Y | Display Name of the attribute | Examples: "Exterior Poster" "Main Theater Video Player" |
| ue4_attr_name | String | Y | The actual UE4 attribute name representing this UObject in Unreal | UE4 class attribute name, i.e., video1 poster2 artist3456 songTrack2234 playlist987 billboard1 poster2 |
| resource | String | Y | UE4 class attribute data that is scheduled | For most attribute types, the value will be a URL that points to a CDN or from Music Metadata API (MMA), i.e., http://cdn.monterey.com/Singer1_2d_video.mov http://cdn.monterey.com/travis_scott_poster.jpg http://mma.monterey.com/artist/3456 http://mma.monterey.com/artist/3456/tracks/2234 http://api.napster.com/v2/playlist/987 http://cdn.monterey.com/hub_billboard_verizon.jpg http://cdn.monterey.com/blimp texture.file This attribute can also contain text, i.e., "Singer1, The Movie brought to you by SK Telecom" |
| deactivated | Boolean | Y | Is the object deactivated? | Default: false |
| created_by | Integer | Y | Foreign key of user who created this content | |
| created_at | datetime | Y | When the record was created | the date-time notation as defined by RFC 3339, section 5.6, for example, 2017-07-21T17:32:28Z |
| updated_at | datetime | Y | Last time the record was updated | the date-time notation as defined by RFC 3339, section 5.6, for example, 2017-07-21T17:32:28Z |

Content Schedule Data Model
This table represents all the available schedules that can be associated to content and their attributes. Each schedule will be used to determine if given a timeframe what content to display inside the Music World.

| Attribute | Data Type | Required | Description | Potential Values |
|---|---|---|---|---|
| schedule_id | Integer | Y | Primary Key | |
| name | String | N | Display name for the schedule | Example: "Taco Tuesdays", "Daily News" |
| frequency | String | Y | Interval at which the content should be activated | Once-Beginning on the start_date, once at the start_time for the duration Daily-Beginning on the start_date, every day at the start_time for the duration, ending on the end_date Weekly-Beginning on the start_date, every week on the same weekday as the start_date at the start_time for the duration, ending on the end_date. Monthly-Beginning on the start_date, every month on the same numerical day of the month as the start_date at the start_time |

| Attribute | Data Type | Required | Description | Potential Values |
|---|---|---|---|---|
| | | | | for the duration, ending on the end_date |
| | | | | Yearly-Beginning on the start_date, every year on the same numerical day of the month as the start_date at the start_time for the duration, ending on the end_date |
| | | | | On-Demand-Every day, all the time |
| | | | | Custom Weekly-Beginning on the start_date, every week on the same weekdays selected at the start_time for the duration, ending on the end_date |
| start_datetime | datetime | Y | Content activation start date | the date-time notation as defined by RFC 3339, section 5.6, for example, 2017-07-21T17:32:28Z |
| end_datetime | datetime | N | Not included = indefinitely | the date-time notation as defined by RFC 3339, section 5.6, for example, 2017-07-21T17:32:28Z |
| weekdays | String | N | If Custom Weekly is selected, lists the weekdays | Examples: mo, tu, we, th, fr, sa, su mo, we, fr |
| duration | int | N | Optional, end time of the event. For content, i.e., videos, end time should be disregarded as a video can extend the end time. | minutes |
| deactivated | Boolean | Y | Is the object deactivated? | Default: false |
| created_by | Integer | Y | Foreign key of user who created this content | |
| created_at | datetime | Y | When the record was created | the date-time notation as defined by RFC 3339, section 5.6, for example, 2017-07-21T17:32:28Z |
| updated_at | datetime | Y | Last time the record was updated | the date-time notation as defined by RFC 3339, section 5.6, for example, 2017-07-21T17:32:28Z |

Example of Event Content

A theater in the Music World playing Singer1's video weekly at 7 PM UTC starting on 05/09/2020.

```
{
"contentId": 122,
"name" : "Main Street Theater",
"UE4ClassName" : "theater01",
"locationId" : 12"                          # R&B Alley
"contentTypeId" : 2,                        # venue
"createdBy" : 1,                            # created by Creator
"deactivated": false,
"createdAt" : "2020-04-09T19:00:00Z"
"updatedAt" : "2020-04-09T19:00:00Z"
}
{
"attrId" : 11223,
"attributeTypeId" : 3,                      # video/url
"contentId" : 122,                          # Main Street Theater
"scheduleId" : 3,                           # Main Street Theater Show Times
"name" : "Main Screen",
"UE4AttributeName" : "video1",
"resource" : "http://cdn.monterey.com/Singer1_2d_video.mov",
"deactivated": false,
"createdBy" : 1,                            # created by Creator
"createdAt" : "2020-04-09T19:00:00Z",
"updatedAt" : "2020-04-09T19:00:00Z"
}
{
"scheduleId" : 3,
"name" : "Main Street Theater Show Times",
"frequency" : "weekly"
```

-continued

```
"start_datetime" : "2020-05-09T19:00:00Z"
"duration" : 125,
"deactivated": false,
"createdBy" : 1,                                    # created by Creator
"createdAt" : "2020-04-09T19:00:00Z",
"updatedAt" : "2020-04-09T19:00:00Z"
}
```

Example of Ad Content

A Verizon billboard in the Music World Hub appears all the time starting on 11/01/2020.

```
{
"contentId" : 04,
"name" : "Billboard on top of Main Theater",
"UE4ClassName" : "hub_billboard02",
"locationId" : 1,"                                  # Hub
"contentTypeId" : 1,                                # Ad
"createdBy" : 1,                                    # created by Creator
"deactivated": false,
"createdAt" : "2020-04-09T19:00:00Z",
"updatedAt" : "2020-04-09T19:00:00Z"
}
{
"attrId" : 478,
"attributeTypeId" : 2,                              # image/url
"contentId" : 04,                                   # Billboard on top of Main Theater
"scheduleId" : 5,                                   # feature billboard schedules
"name" : "Feature billboard",
"UE4AttributeName" : "image01",
"resource" : "http://cdn.monterey.com/verizon_featuring_madison_beer_billboard-
.jpg",
"deactivated": false,
"createdBy" : 1,                                    # created by Creator
"createdAt" : "2020-04-09T19:00:00Z",
"updatedAt" : "2020-04-09T19:00:00Z"
}
{
"scheduleId" : 5,
"name" : "feature billboard schedule",
"frequency" : "on-demand",
"start_datetime" : "2020-11-01T00:00:00Z",
"deactivated": false,
"createdBy" : 1,                                    # created by Creator
"createdAt" : "2020-04-09T19:00:00Z",
"updatedAt" : "2020-04-09T19:00:00Z"
}
```

Figure 6:
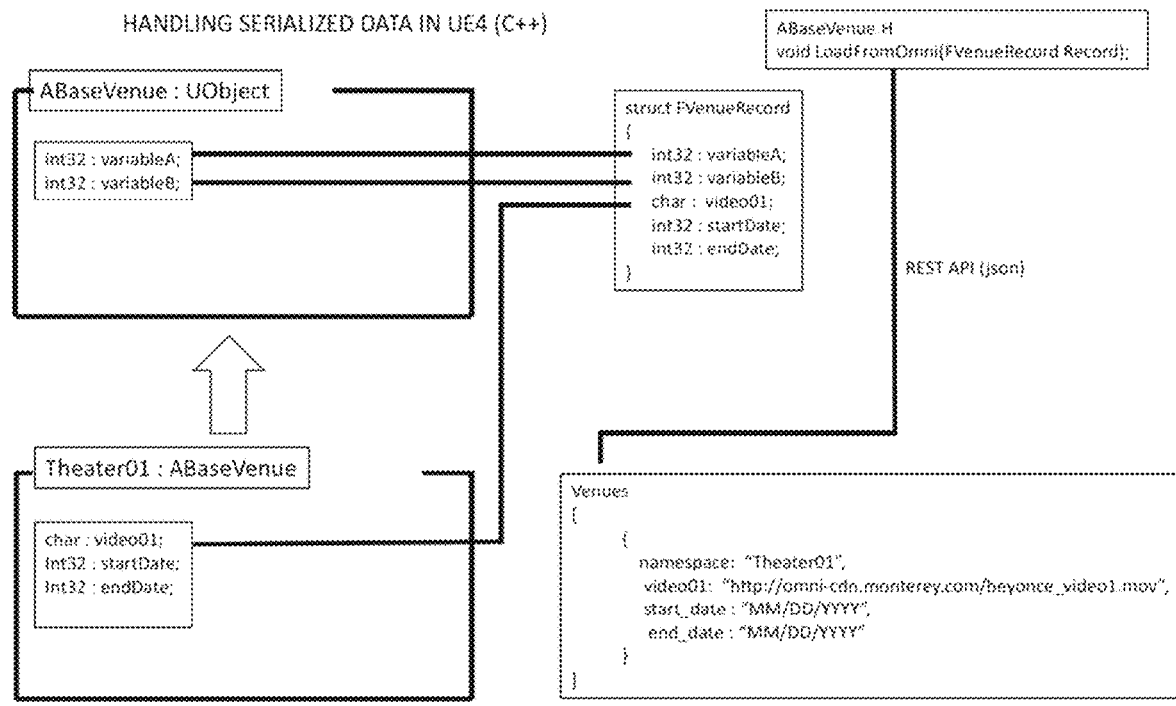
FIG. 6 is a UE4 client interface application in accordance with one implementation of the present disclosure.

FIG. 6 is a UE4 client interface application 600 in accordance with one implementation of the present disclosure. In FIG. 6, the UE4 client interface application 600 loads serialized JSON data received from the API endpoints. Upon receiving the requested data, the client code is designed such that the Unreal Engine base UObject and AActor objects either dynamically encapsulate the JSON data (extensible design) or map directly to object attributes (low LOE, preferred). In the example, there is a Theater01 object that inherits from a ABaseVenue class. The Theater01 object upon calling LoadFromCOMPS( ) will now contain data retrieved from the COMP system.

FIGS. 7 through 22 show user interface/UX design and functionality requirements. The COMP system users uses a web portal to program content for the Music World.

Figure 7:
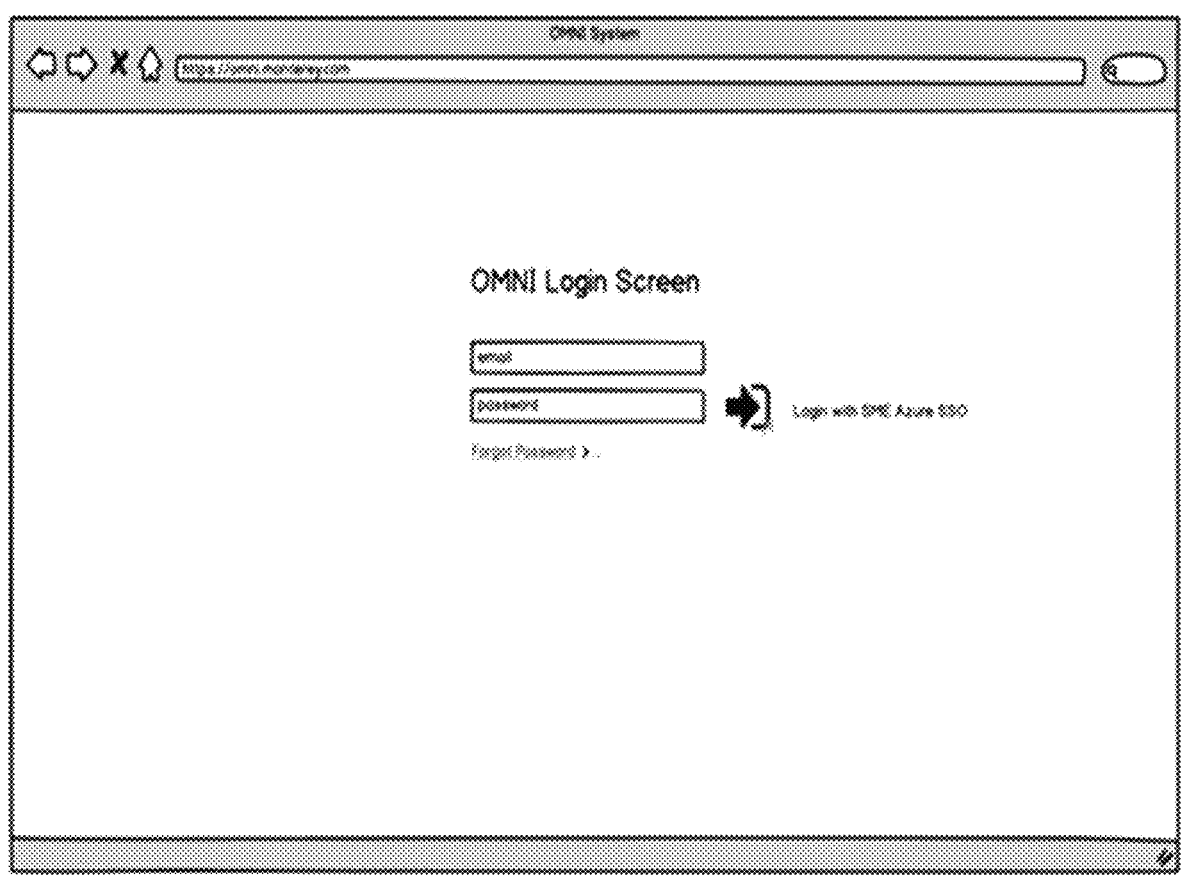
FIG. 7 shows a login page that will need to integrate with Sony Music's Azure Active Directory for identity management of users.

FIG. 7 shows a login page that will need to integrate with Sony Music's Azure Active Directory for identity management of users.

Main Dashboard (Landing Page)

Once logged in, the user will be directed to the main dashboard that contains Today's and This Week's content programming schedule adjustable by time ranges. All time-based content will be displayed in user's local time. The main dashboard needs calendar viewing options. Further, through the dashboard, the users: (1) Search for any content; (2) Logout taking them back to the login page; (3) Breadcrumb style links to individual types of content; (4) Each tab will take the user to the content type specific page, based on permissions, they can view, edit or create a new content program schedule; (5) Tabs are procedural generated based on content types in the database; (6) System settings to allow them to define new content types, attribute types, locations, and calendars.

Figure 8:
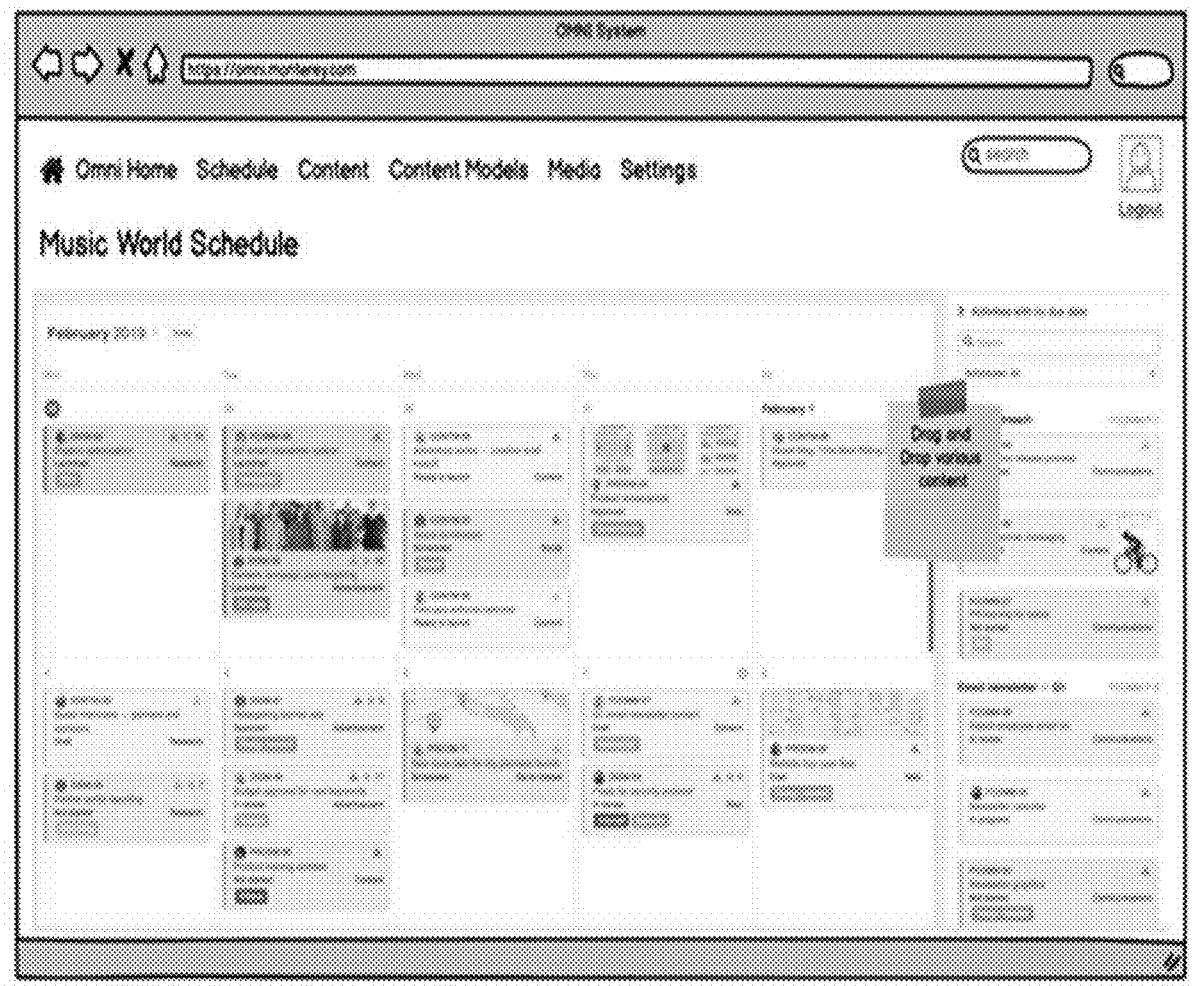
FIG. 8 shows a schedule view.

FIG. 8 shows a schedule view.

System Settings Page

Based on permissions, a user will be able to perform the following functionality: Invite/Deactivate COMPS users Review user logs; Add/edit/delete locations; Add/edit/delete content types; Add/edit/delete attribute types.

Figure 9:
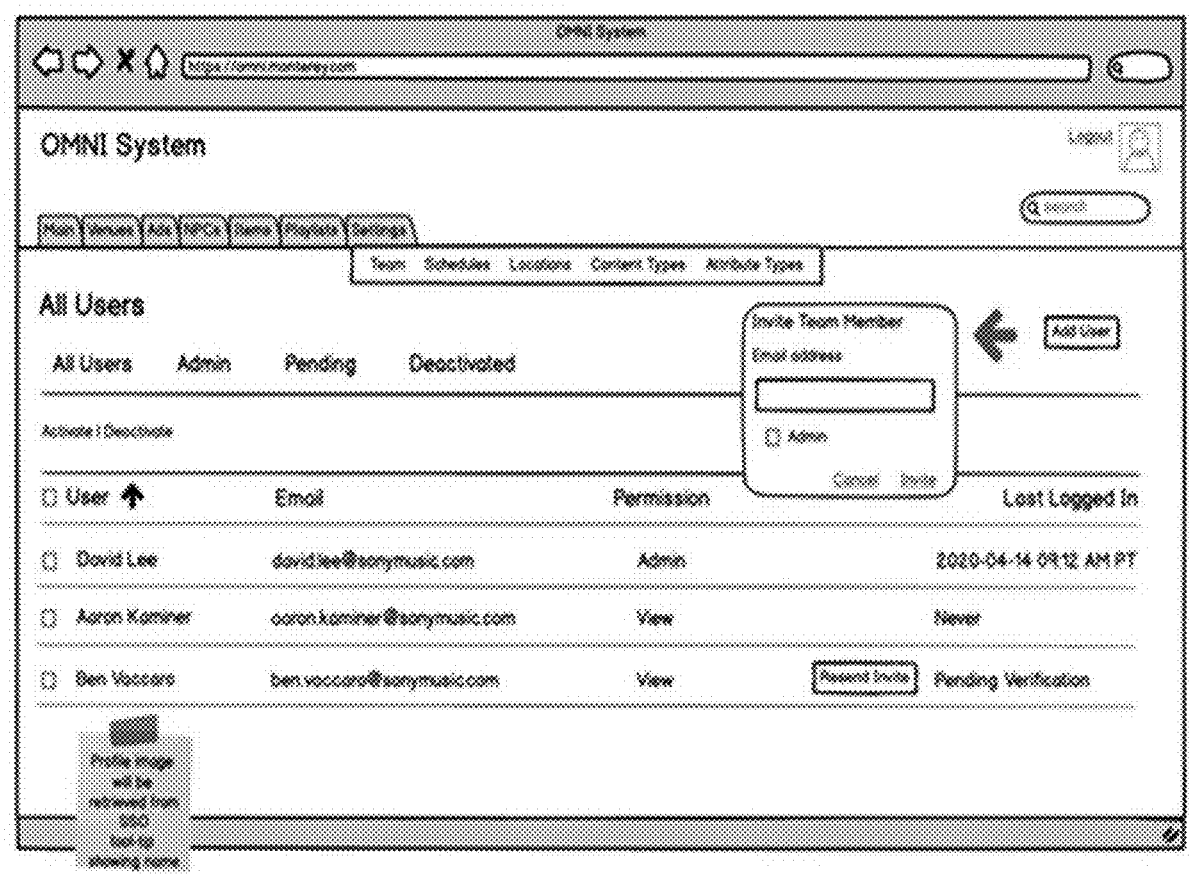
FIG. 9 shows All Users page.

FIG. 9 shows All Users page. Admin users can deactivate users. Sending an invite will send a verification email so the account is 'Pending'. If an Admin resends an invite to a 'Pending' user, a new verification code will be sent. The verification code can be stored in the Sessions table or adding a new attribute to the Users table for the verification code.

Figure 10:
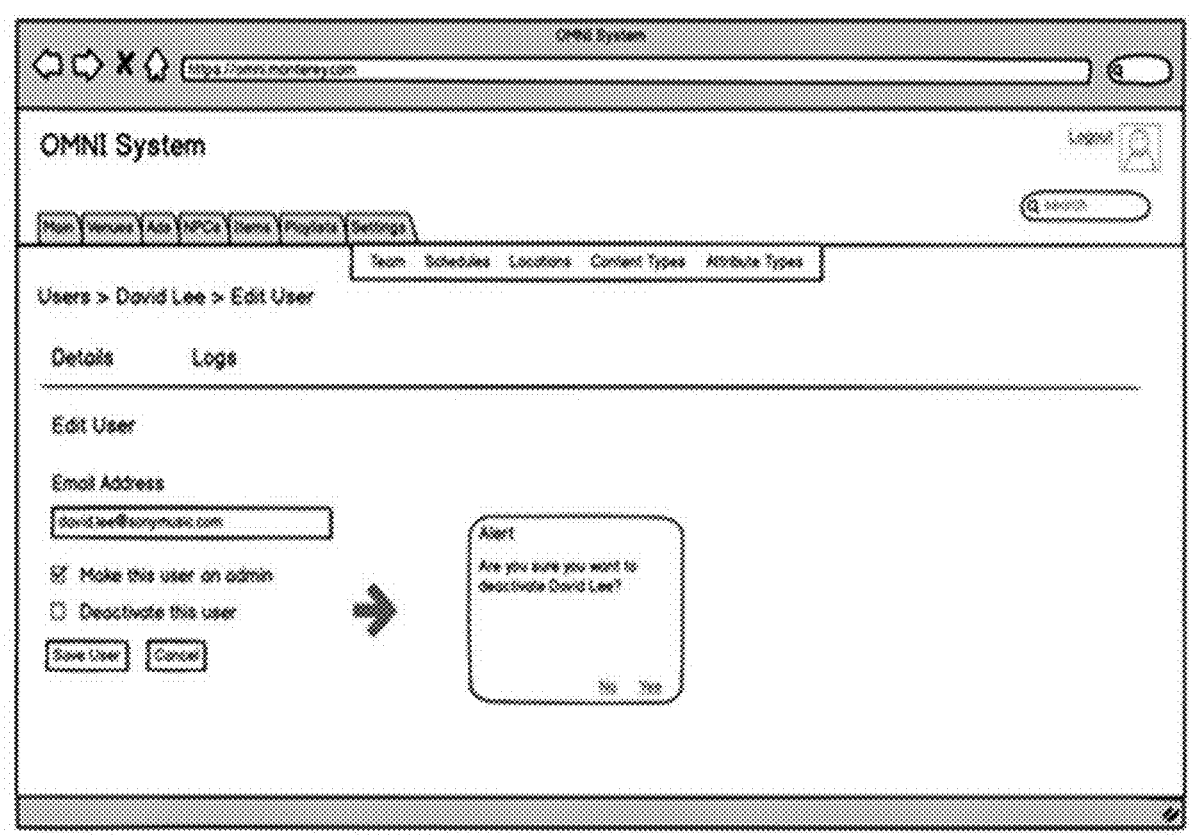
FIG. 10 shows Edit Users page.

FIG. 10 shows Edit Users page. Clicking logs will show all information for the particular user from the logs table.

Figure 11:
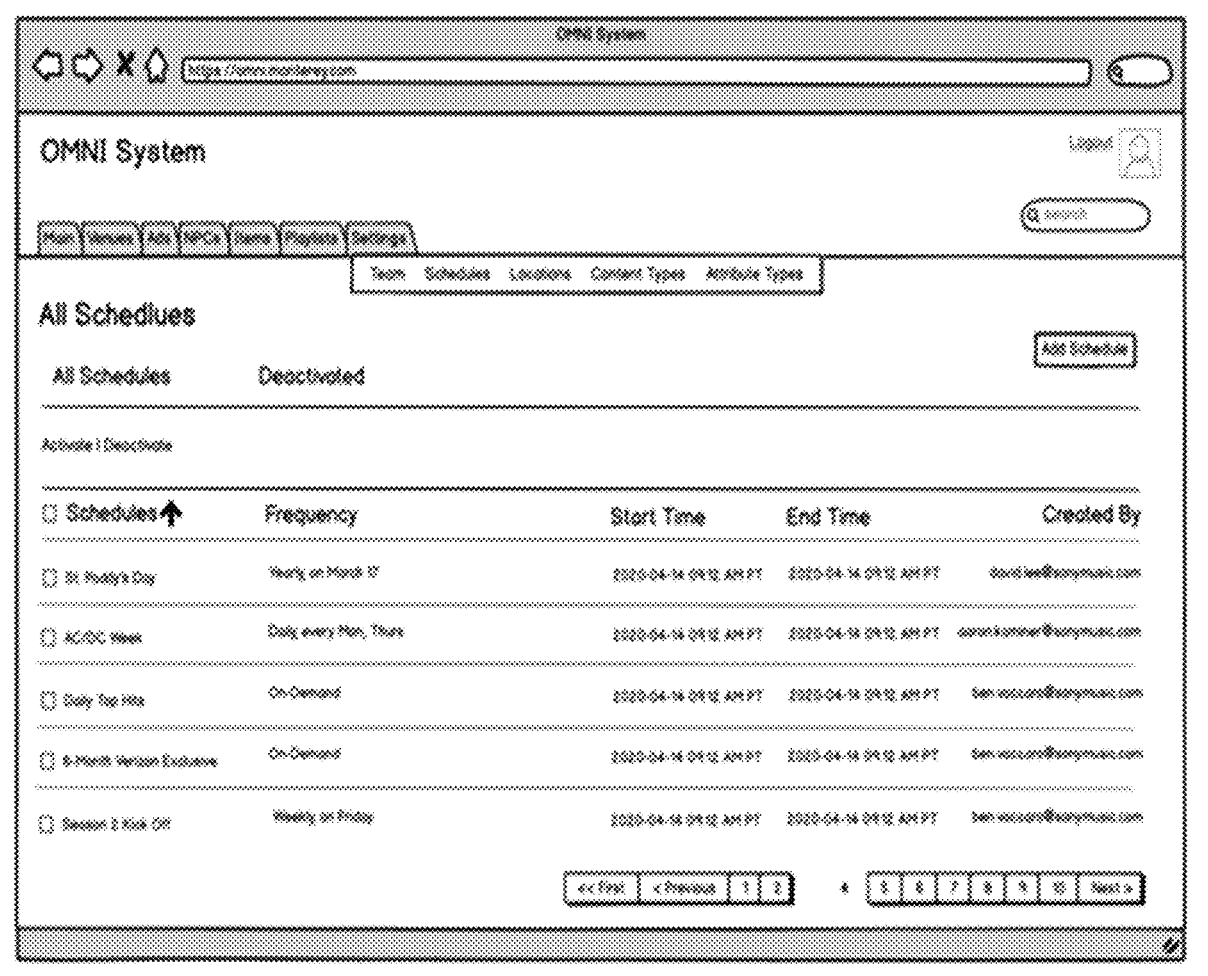

FIG. 11 shows All Schedules page. This page Depicts a screenshot where a user viewing the admin web portal can view all scheduled content that would be procedurally generated in the Music World.

Figure 12:
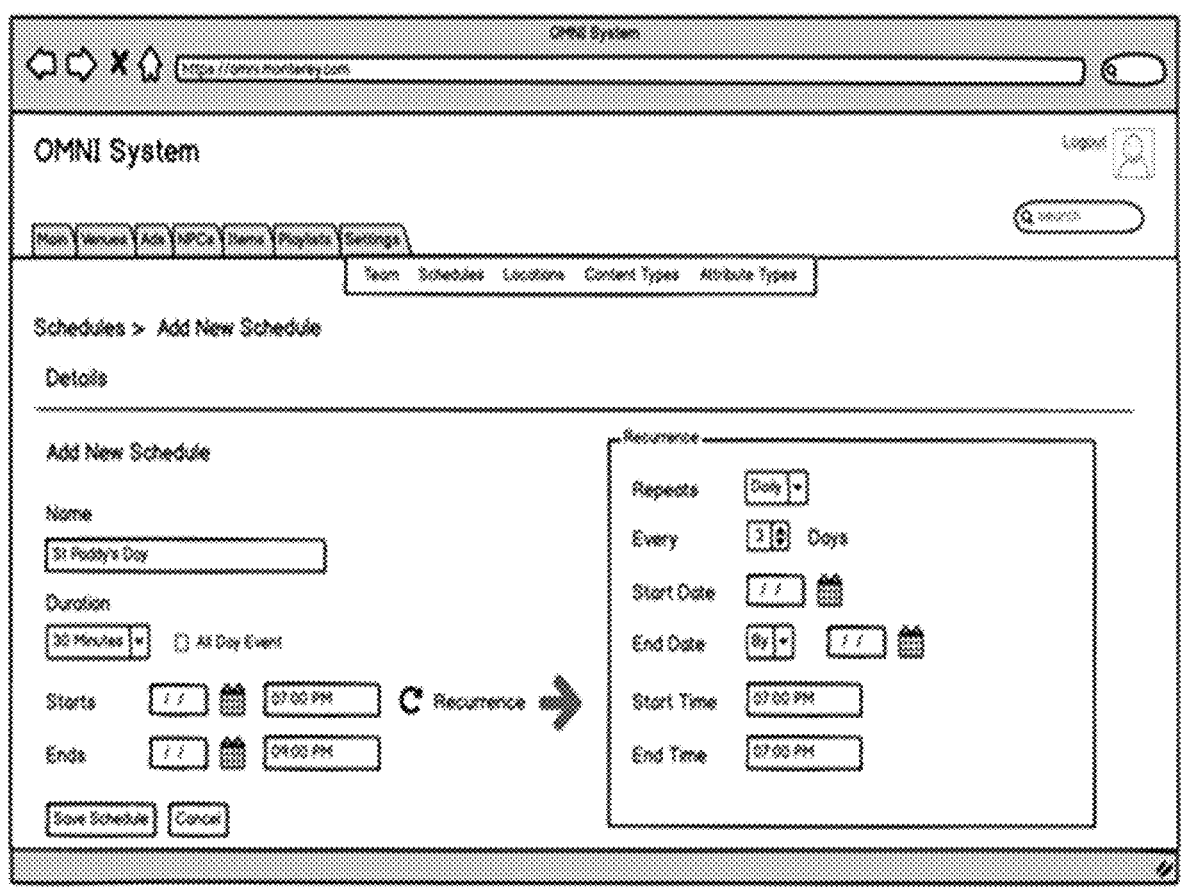
FIG. 12 shows Add Schedules page.

FIG. 12 shows Add Schedules page. This page depicts a screenshot where a user can create a new schedule for content.

Figure 13:
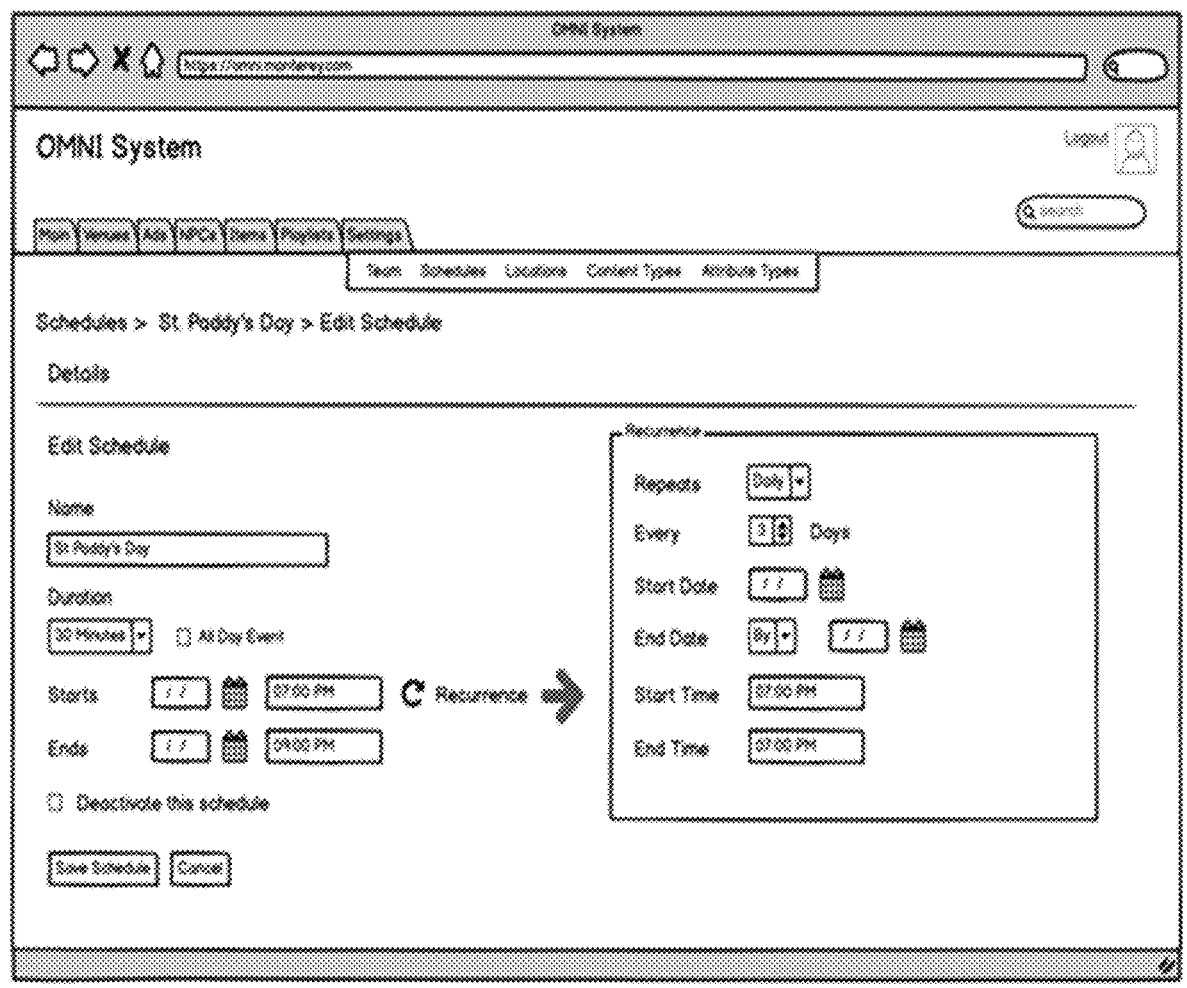
FIG. 13 shows Edit Schedule page.

FIG. 13 shows Edit Schedule page. This page depicts a screenshot where a user can edit a schedule for content.

Figure 14:
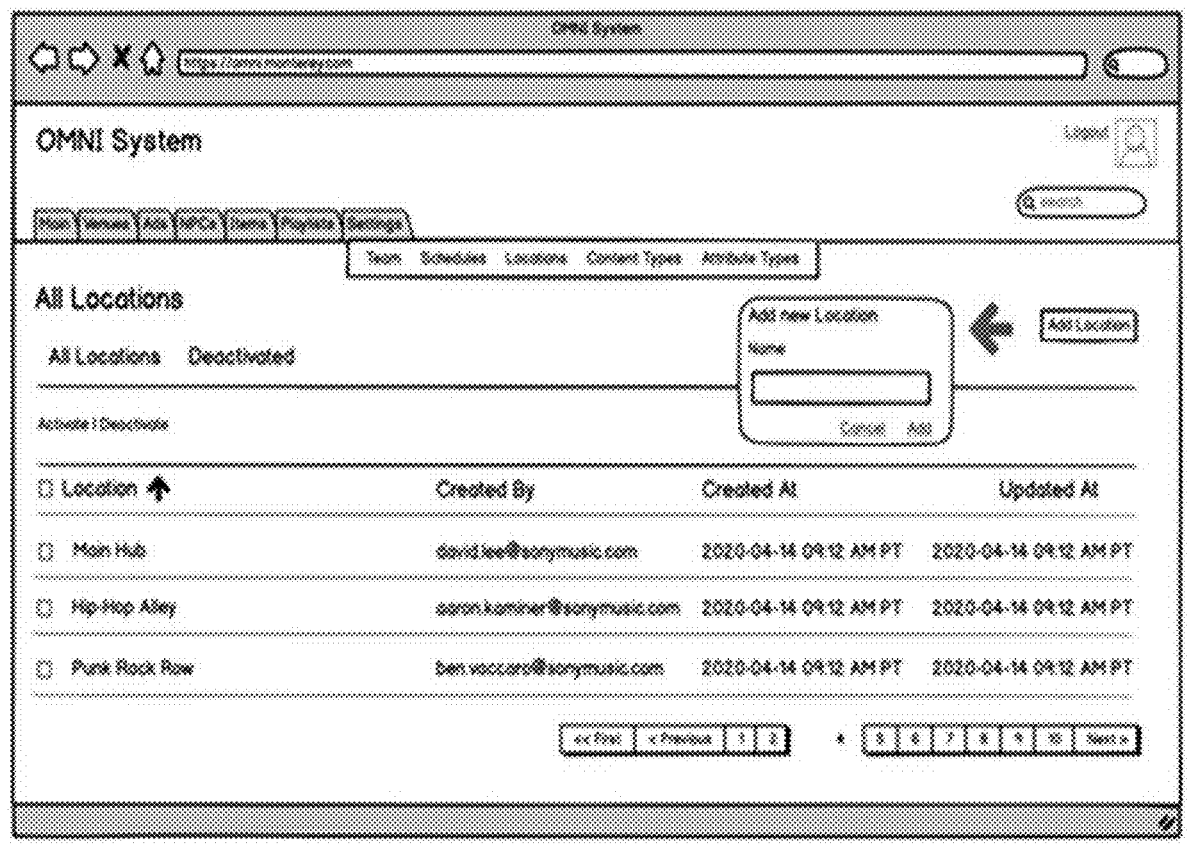
FIG. 14 shows All Locations page.

FIG. 14 shows All Locations page. This page depicts a screenshot where a user can view all available locations within the Music World where content can be scheduled to be viewed by users.

Figure 15:
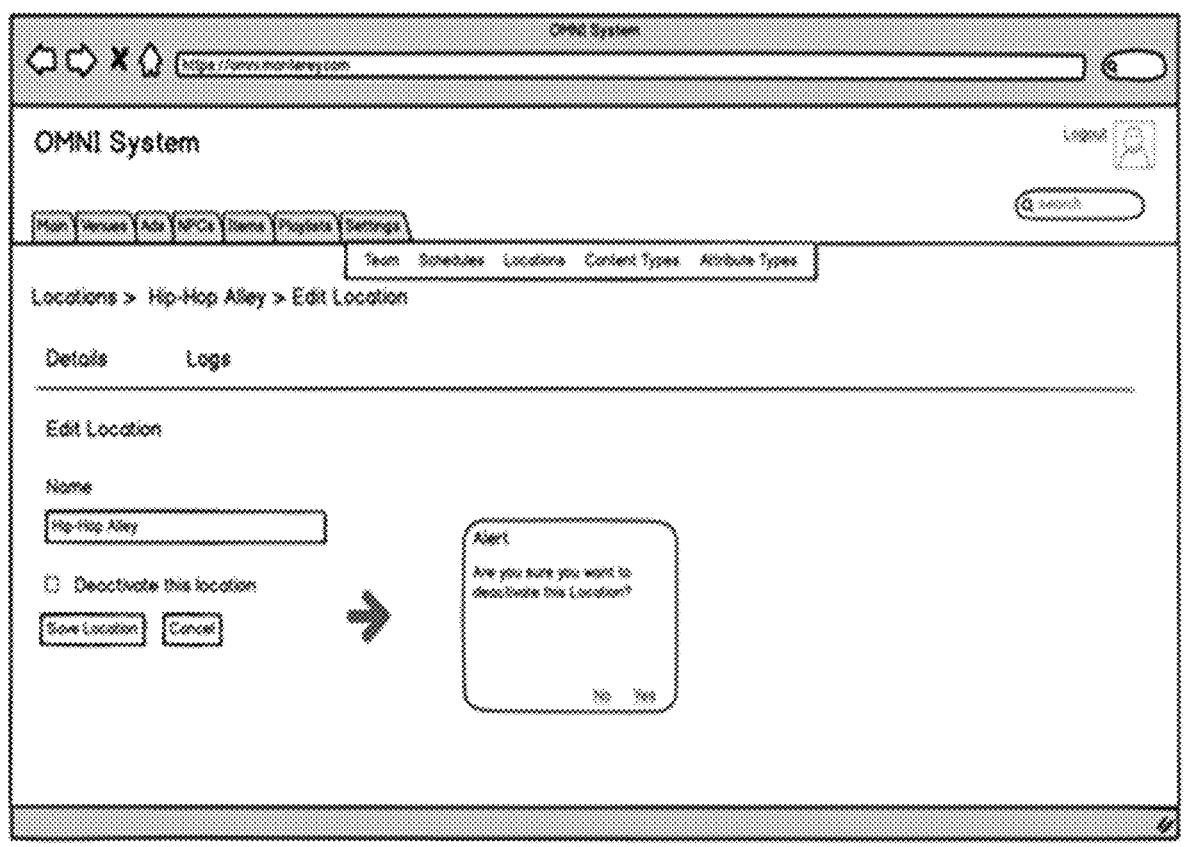
FIG. 15 shows Edit Location page.

FIG. 15 shows Edit Location page. This page depicts a screenshot where a user can edit a location within the Music World client.

Figure 16:
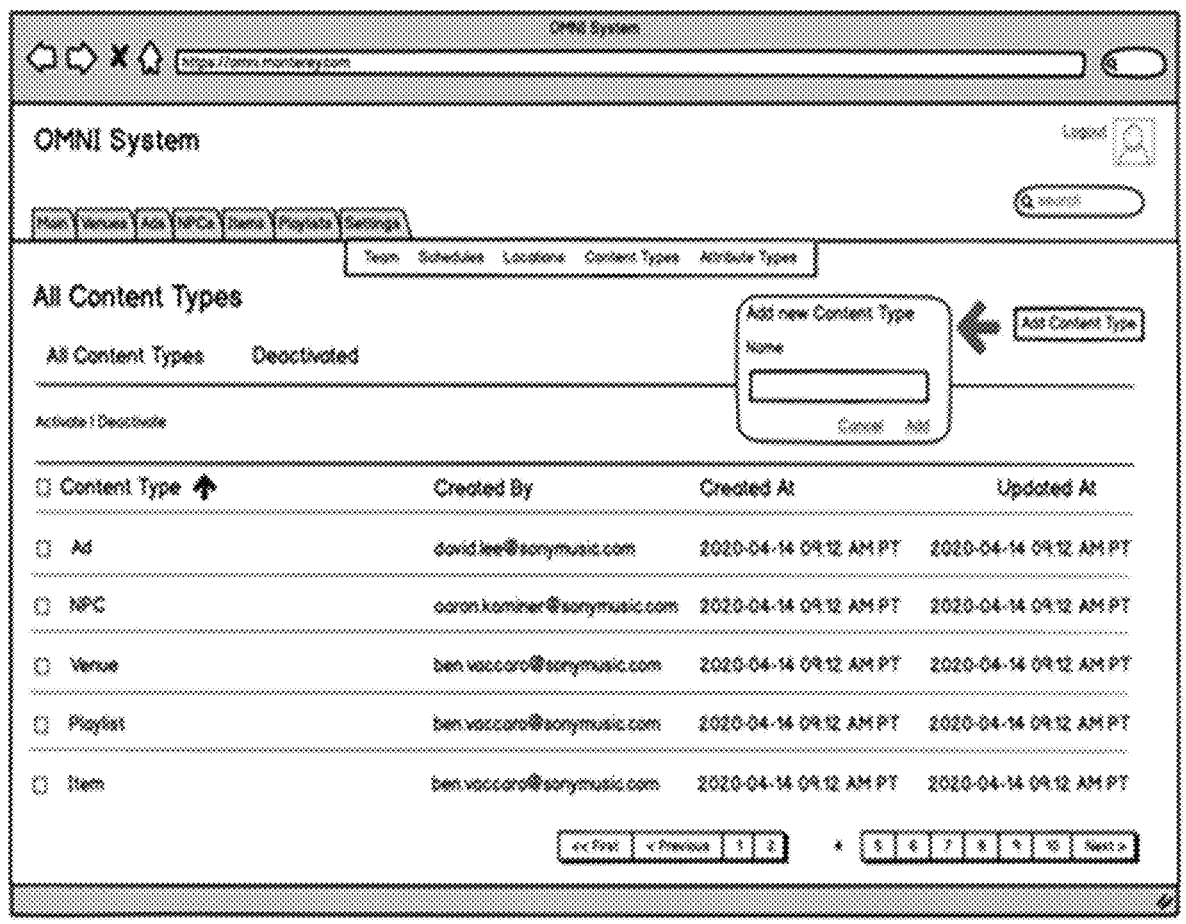
FIG. 16 shows All Content Types page.

FIG. 16 shows All Content Types page. This page depicts a screenshot where a user can view all available content models within the Music World.

Figure 17:
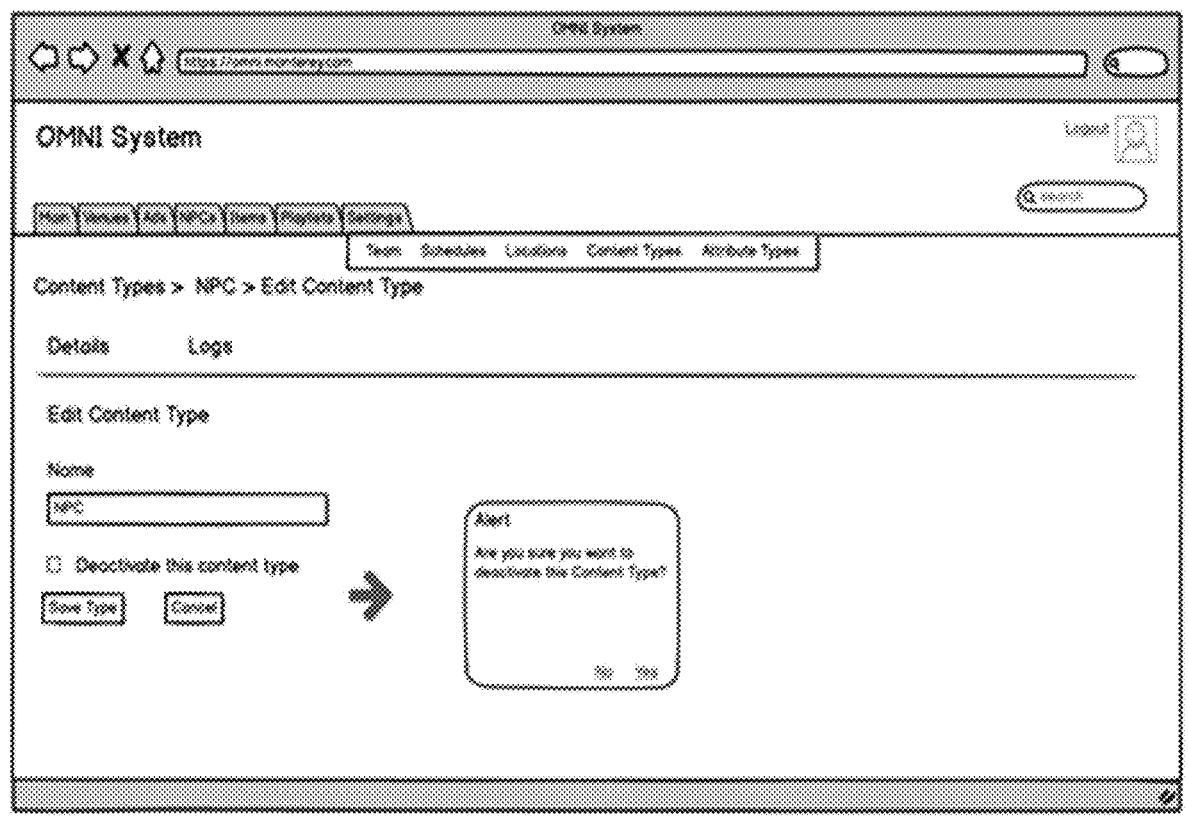
FIG. 17 shows Edit Content Type page.

FIG. 17 shows Edit Content Type page. This page depicts a screenshot where a user can edit a specific content model.

Figure 18:
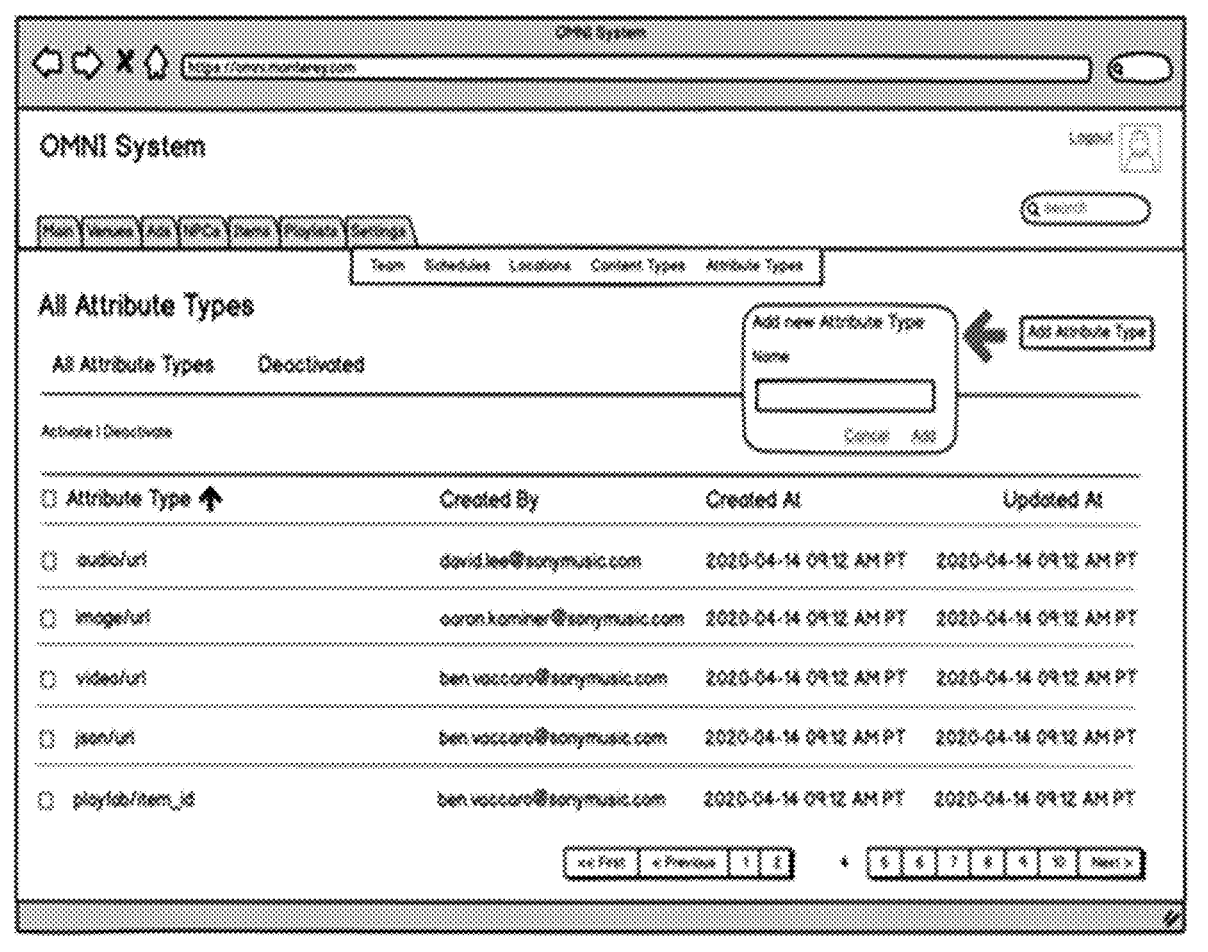

FIG. 18 shows All Attribute Types page. This page depicts a screenshot where a user can view all available attribute types of data that can exist in a content model/type.

Figure 19:
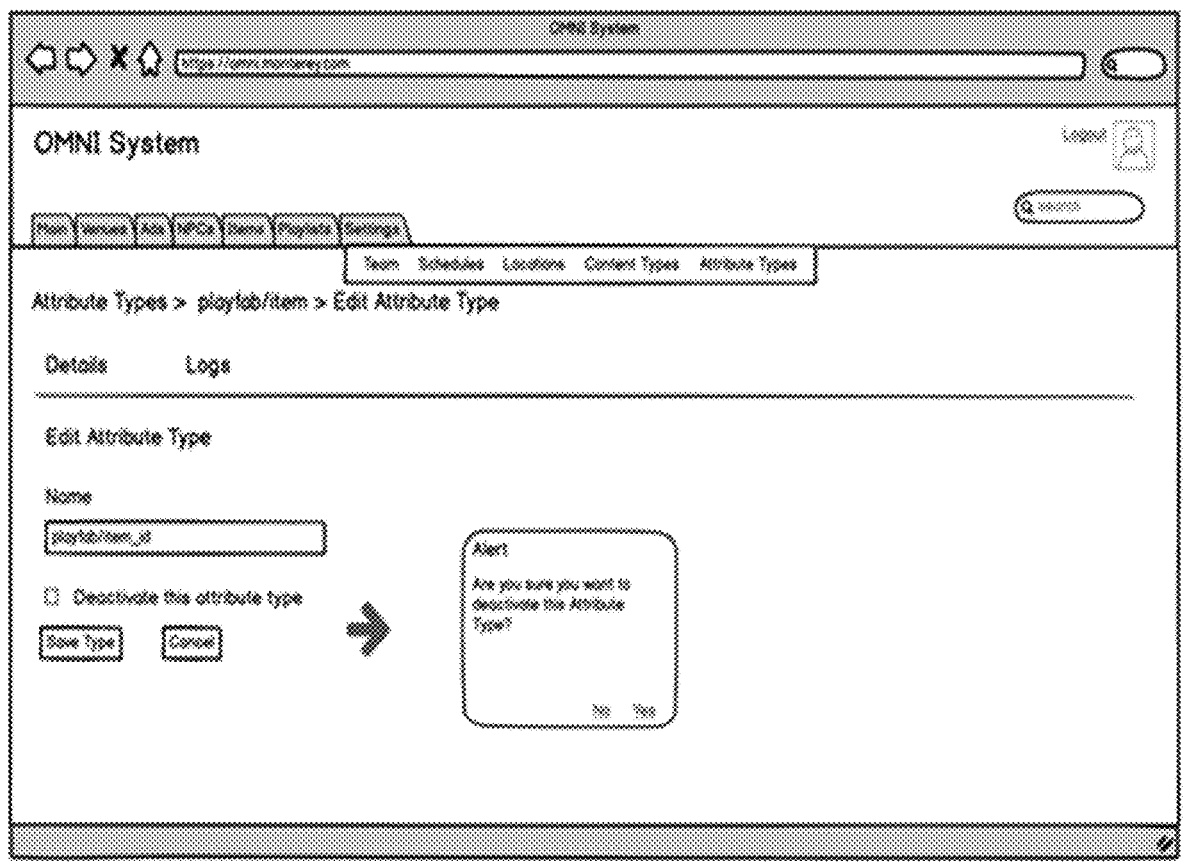
FIG. 19 shows Edit Attribute Type page.

FIG. 19 shows Edit Attribute Type page. This page depicts a screenshot where a user can edit a specific data attribute type.

Figure 20:
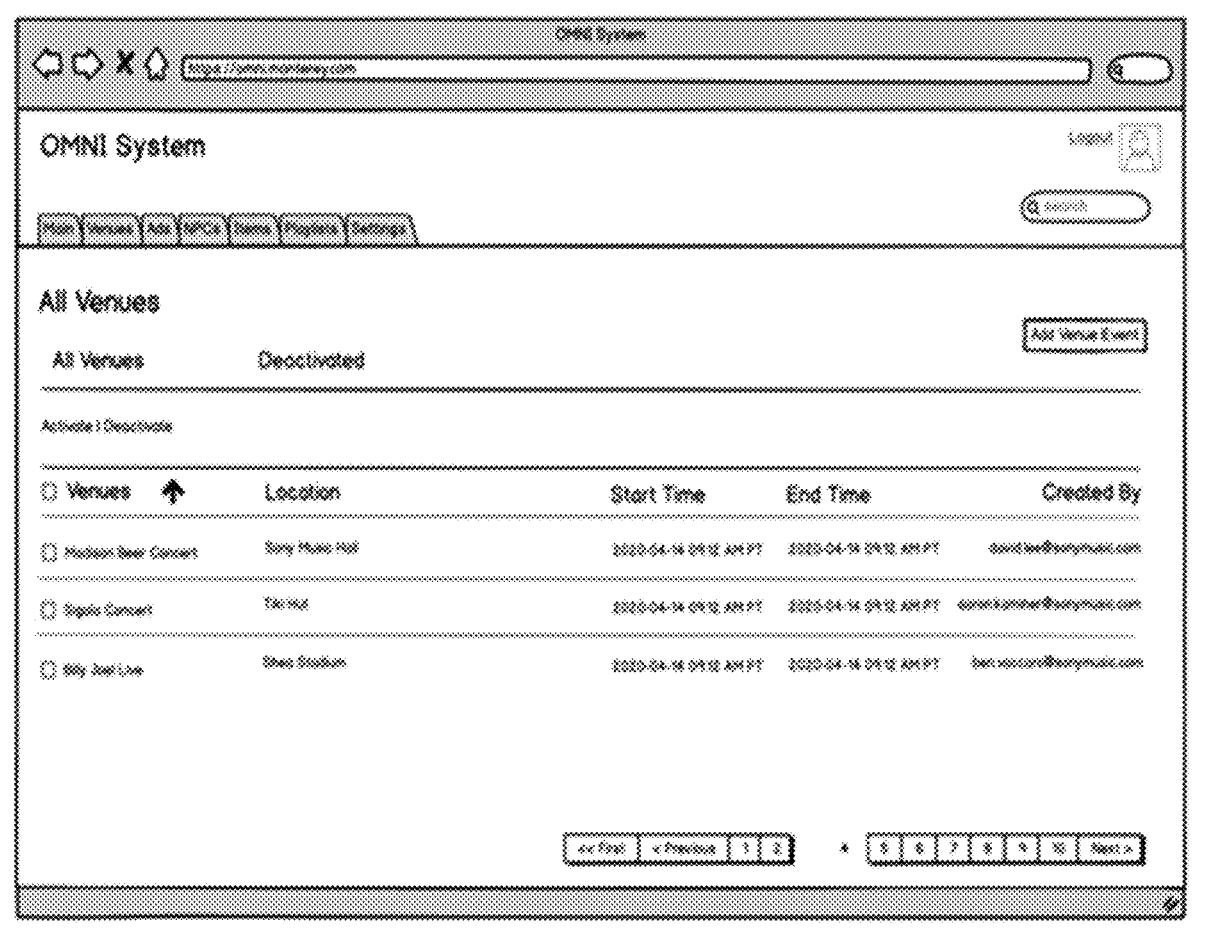

FIG. 20 shows All Venues page. This page depicts a screenshot where a user can view all available venues within the Music World where content can be scheduled to be viewed by users (e.g., a concert or musical performance).

Figure 21:
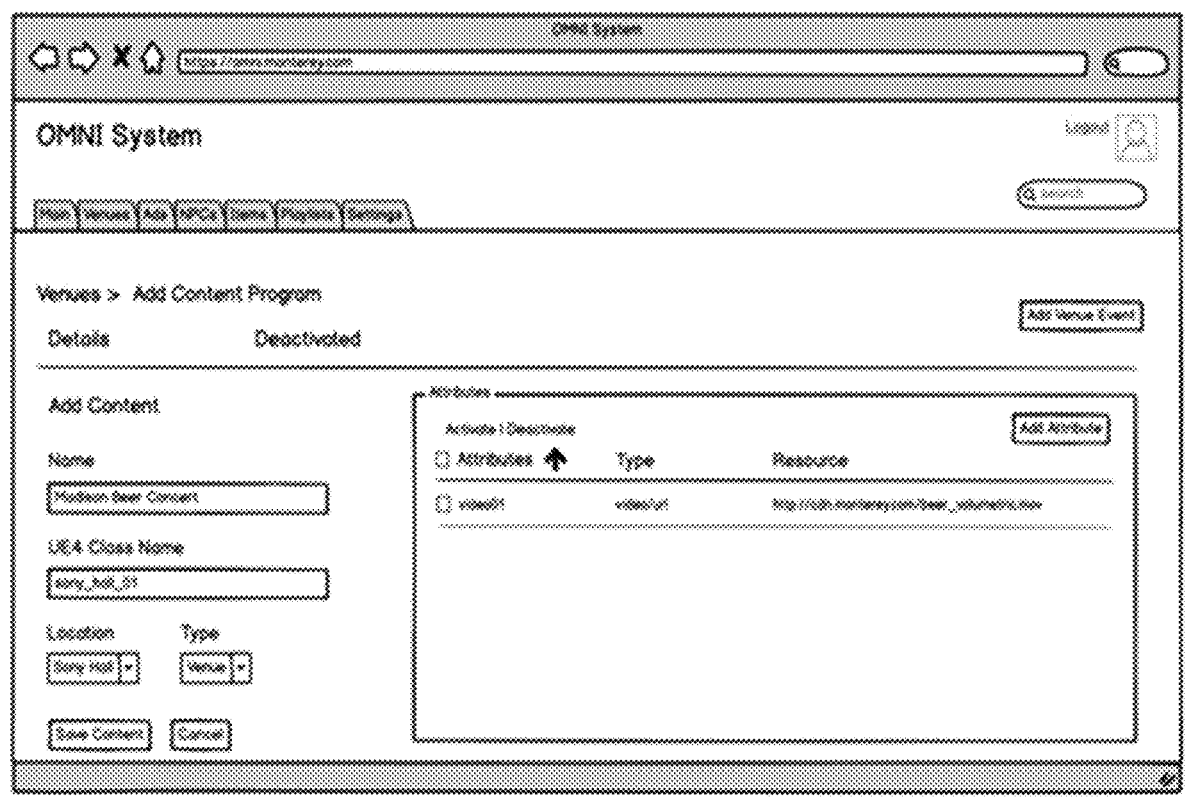
FIG. 21 shows Add Content Programming page.

FIG. 21 shows Add Content Programming page. This page depicts a screenshot where a user can create a specific schedule content program within the Music World.

FIG. 22 shows Add Content Attributes page. This page depicts a screenshot where a user add a new attribute made up of a an attribute type and actual data.

Attribute Type Resource Mapping durally generated, at step 2330, by the virtual world client in a real-time game engine for live experiences in a virtualized music-themed world. In one implementation, the procedural generation of the content elements includes server-side control over one or more of: what content is rendered; where the content is rendered; when the content is rendered (and for how long); and what the content costs.

In one implementation, the client then renders out the content elements, at step 2340, from text, audio, music, and video source files at specific choreographed times within a virtual setting (e.g., a virtual concert venue). Content producers may define content packs and program event schedules through a web interface where data is stored in both a relational database and in a cache with programming in Java that uses reflection to define content models.

Figure 24:
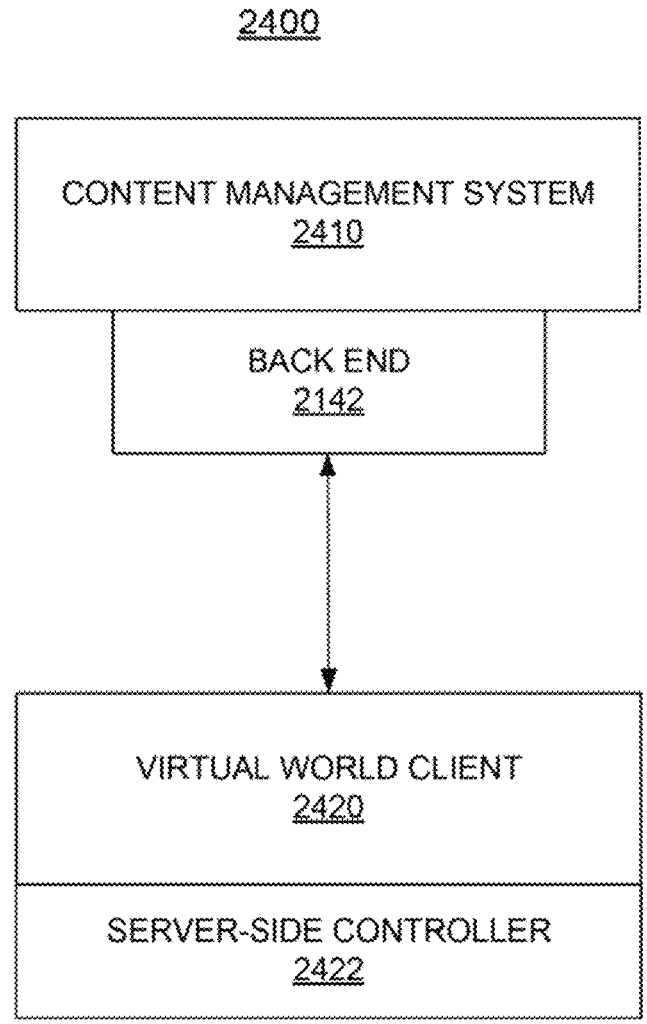
FIG. 24 is a block diagram of a system for procedurally generating live experiences for a 3-D virtualized music world in accordance with one implementation of the present disclosure.

FIG. 24 is a block diagram of a system 2400 for procedurally generating live experiences for a 3-D virtualized music world in accordance with one implementation of the present disclosure. In the illustrated implementation of FIG. 24, the system 2400 includes a headless content management system (CMS) 2410 and a virtual world client 2420. In one implementation, the headless content management system 2410 supports management of back end 2412 of the CMS. In one implementation, the virtual world client 2420 couples to the back end using an interface that provides a content packaging framework to enable customized event scheduling and destination management. In one implementation, the virtual-world client 2420 procedurally generates a plurality of content elements in a real-time game engine for live experiences in a virtualized music-themed world.

In one implementation, the virtual-world client 2420 includes server-side controller 2422 which provides control over one or more of: what content is rendered; where the content is rendered; when the content is rendered (and for how long); and what the content costs. In one implementation, the virtual-world client 2420 also renders out the content elements from text, audio, music, and video source

| Attribute Type | Data Description |
| --- | --- |
| audio/url | |
| image/url | Allow user to upload media asset to COMPS CDN and output resulting CDN URL |
| video/url | |
| json/url | Input URL. |
| text/text | Input Text |
| text/json | |
| playfab/url | |
| playfab/quest_name | Depending attribute type, will use PlayFab Admin API to populate pull down with associated type values, storing resulting attribute IDs |
| playfab/item_id | |
| Napster/artist_id | Depending attribute type, will use Napster API to populate pull down with |
| Napster/playlist | associated type values, storing resulting attribute IDs |

Figure 23:
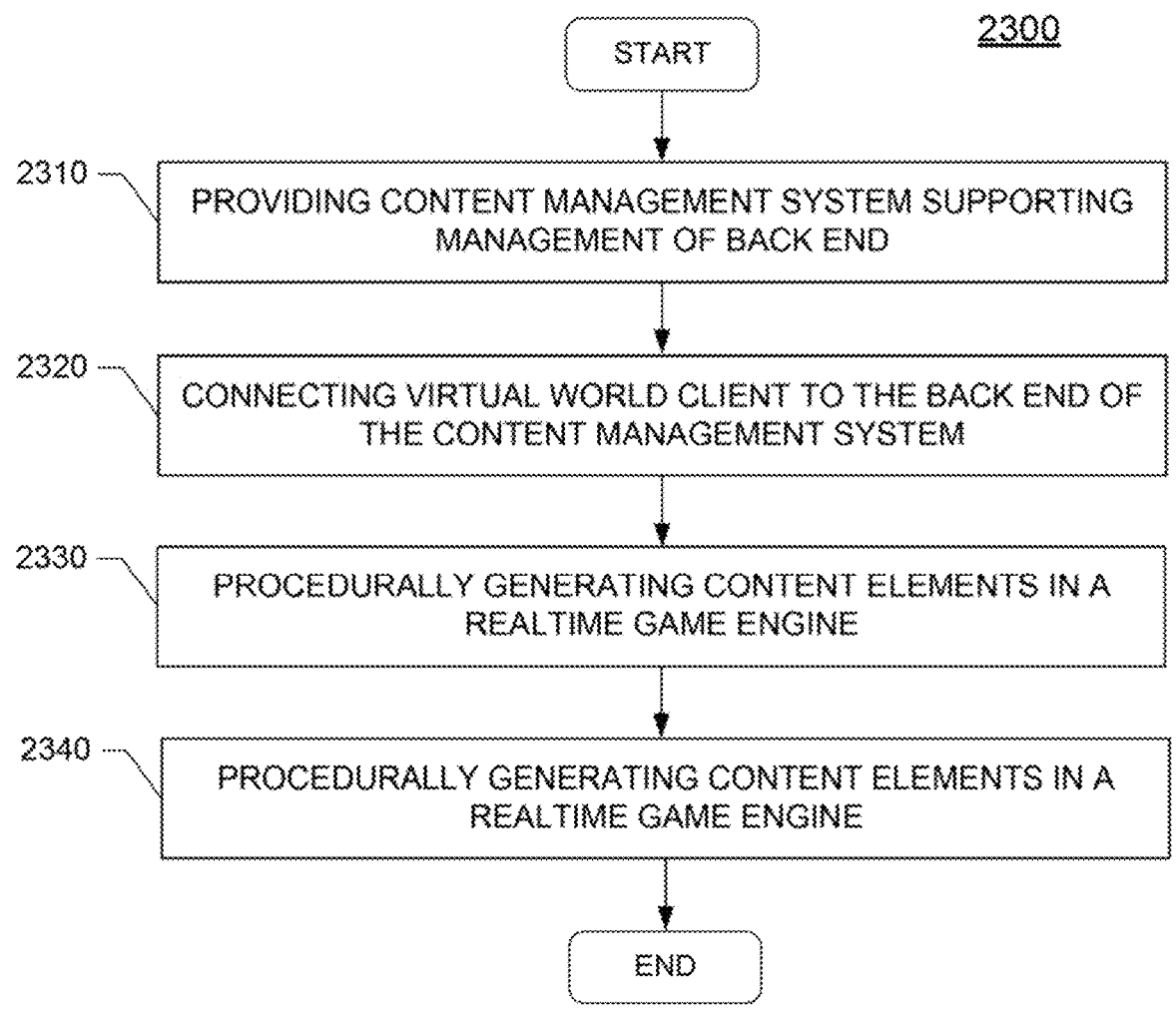
FIG. 23 is a flow diagram of a method for procedurally generating live experiences for a 3-D virtualized music world in accordance with one implementation of the present disclosure.

FIG. 23 is a flow diagram of a method 2300 for procedurally generating live experiences for a 3-D virtualized music world in accordance with one implementation of the present disclosure. In the illustrated implementation of FIG. 23, a headless content management system (CMS) supporting management of back end is provided, at step 2310. A virtual world client is coupled to the back end of the CMS, at step 2320, using an interface that provides a content packaging framework to enable customized event scheduling and destination management. In one implementation, the interface is the GraphQL interface which is a language spoken between the back end and the front end to exchange information. A plurality of content elements is then procefiles at specific choreographed times within a virtual setting (e.g., a virtual concert venue).

Figure 25A:
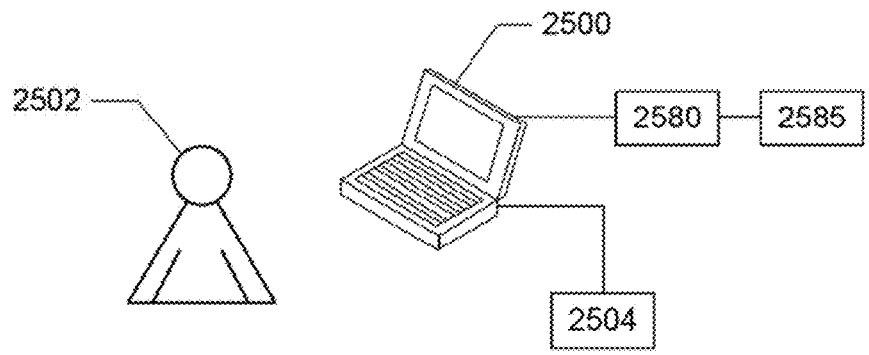
FIG. 25A is a representation of a computer system and a user in accordance with an implementation of the present disclosure.

FIG. 25A is a representation of a computer system 2500 and a user 2502 in accordance with an implementation of the present disclosure. The user 2502 uses the computer system 2500 to implement an application 2590 for procedurally generating live experiences for a 3-D virtualized music world as illustrated and described with respect to the method 2300 illustrated in FIG. 23 and the system 2400 illustrated in FIG. 24.

Figure 25B:
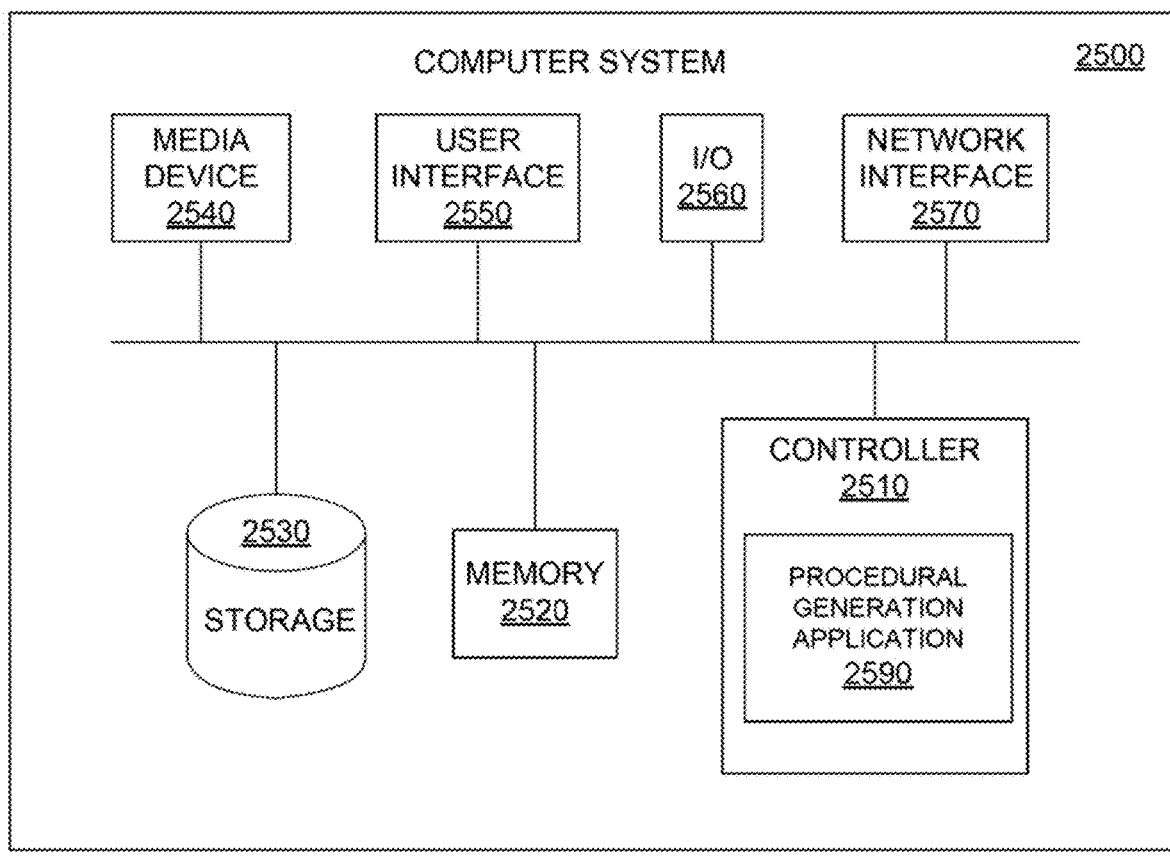
FIG. 25B is a functional block diagram illustrating the computer system hosting the procedural generation application in accordance with an implementation of the present disclosure.

The computer system 2500 stores and executes the procedural generation application 2590 of FIG. 25B. In addition, the computer system 2500 may be in communication with a software program 2504. Software program 2504 may include the software code for the procedural generation application 2590. Software program 2504 may be loaded on an external medium such as a CD, DVD, or a storage drive, as will be explained further below.

Furthermore, computer system 2500 may be connected to a network 2580. The network 2580 can be connected in various different architectures, for example, client-server architecture, a Peer-to-Peer network architecture, or other type of architectures. For example, network 2580 can be in communication with a server 2585 that coordinates engines and data used within the procedural generation application 2590. Also, the network can be different types of networks. For example, the network 2580 can be the Internet, a Local Area Network or any variations of Local Area Network, a Wide Area Network, a Metropolitan Area Network, an Intranet or Extranet, or a wireless network.

FIG. 25B is a functional block diagram illustrating the computer system 2500 hosting the procedural generation application 2590 in accordance with an implementation of the present disclosure. A controller 2510 is a programmable processor and controls the operation of the computer system 2500 and its components. The controller 2510 loads instructions (e.g., in the form of a computer program) from the memory 2520 or an embedded controller memory (not shown) and executes these instructions to control the system. In its execution, the controller 2510 provides the procedural generation application 2590 with a software system, such as to enable the creation and configuration of engines and data generators within the procedural generation application 2590. Alternatively, this service can be implemented as separate hardware components in the controller 2510 or the computer system 2500.

Memory 2520 stores data temporarily for use by the other components of the computer system 2500. In one implementation, memory 2520 is implemented as RAM. In one implementation, memory 2520 also includes long-term or permanent memory, such as flash memory and/or ROM.

Storage 2530 stores data either temporarily or for long periods of time for use by the other components of the computer system 2500. For example, storage 2530 stores data used by the procedural generation application 2590. In one implementation, storage 2530 is a hard disk drive.

The media device 2540 receives removable media and reads and/or writes data to the inserted media. In one implementation, for example, the media device 2540 is an optical disc drive.

The user interface 2550 includes components for accepting user input from the user of the computer system 2500 and presenting information to the user 2502. In one implementation, the user interface 2550 includes a keyboard, a mouse, audio speakers, and a display. The controller 2510 uses input from the user 2502 to adjust the operation of the computer system 2500.

The I/O interface 2560 includes one or more I/O ports to connect to corresponding I/O devices, such as external storage or supplemental devices (e.g., a printer or a PDA). In one implementation, the ports of the I/O interface 2560 include ports such as: USB ports, PCMCIA ports, serial ports, and/or parallel ports. In another implementation, the I/O interface 2560 includes a wireless interface for communication with external devices wirelessly.

The network interface 2570 includes a wired and/or wireless network connection, such as an RJ-45 or "Wi-Fi" interface (including, but not limited to 802.11) supporting an Ethernet connection.

The computer system 2500 includes additional hardware and software typical of computer systems (e.g., power, cooling, operating system), though these components are not specifically shown in FIG. 25B for simplicity. In other implementations, different configurations of the computer system can be used (e.g., different bus or storage configurations or a multi-processor configuration).

In one implementation, the system 2400 is a system configured entirely with hardware including one or more digital signal processors (DSPs), general purpose microprocessors, application specific integrated circuits (ASICs), field programmable gate/logic arrays (FPGAs), or other equivalent integrated or discrete logic circuitry. In another implementation, the system 2400 is configured with a combination of hardware and software.

The description herein of the disclosed implementations is provided to enable any person skilled in the art to make or use the present disclosure. Numerous modifications to these implementations would be readily apparent to those skilled in the art, and the principals defined herein can be applied to other implementations without departing from the spirit or scope of the present disclosure. Thus, the present disclosure is not intended to be limited to the implementations shown herein but is to be accorded the widest scope consistent with the principal and novel features disclosed herein.

Various implementations of the present disclosure are realized in electronic hardware, computer software, or combinations of these technologies. Some implementations include one or more computer programs executed by one or more computing devices. In general, the computing device includes one or more processors, one or more data-storage components (e.g., volatile or non-volatile memory modules and persistent optical and magnetic storage devices, such as hard and floppy disk drives, CD-ROM drives, and magnetic tape drives), one or more input devices (e.g., game controllers, mice and keyboards), and one or more output devices (e.g., display devices).

The computer programs include executable code that is usually stored in a persistent storage medium and then copied into memory at run-time. At least one processor executes the code by retrieving program instructions from memory in a prescribed order. When executing the program code, the computer receives data from the input and/or storage devices, performs operations on the data, and then delivers the resulting data to the output and/or storage devices.

Those of skill in the art will appreciate that the various illustrative modules and method steps described herein can be implemented as electronic hardware, software, firmware or combinations of the foregoing. To clearly illustrate this interchangeability of hardware and software, various illustrative modules and method steps have been described herein generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the present disclosure. In addition, the grouping of functions within a module or step is for ease of description. Specific functions can be moved from one module or step to another without departing from the present disclosure.

All features of each above-discussed example are not necessarily required in a particular implementation of the present disclosure. Further, it is to be understood that the description and drawings presented herein are representative of the subject matter that is broadly contemplated by the present disclosure. It is further understood that the scope of the present disclosure fully encompasses other implementations that may become obvious to those skilled in the art and that the scope of the present disclosure is accordingly limited by nothing other than the appended claims.

The invention claimed is:

1. A method for procedurally generating live experiences for a virtualized music-themed world, the method comprising:
   providing a headless content management system supporting management of back end;
   coupling a virtual world client to the back end of the content management system using an interface that provides a content packaging framework to enable customized event scheduling and destination management; and
   procedurally generating a plurality of content elements in a real-time game engine for live experiences in the virtualized music-themed world.

2. The method of claim 1, wherein procedurally generating comprises
   providing a server-side control over how the plurality of content elements is rendered.

3. The method of claim 2, wherein the server-side control comprises control over what content element is rendered.

4. The method of claim 2, wherein the server-side control comprises control over where the content element is rendered.

5. The method of claim 2, wherein the server-side control comprises control over when the content element is rendered and for how long.

6. The method of claim 2, wherein the server-side control comprises control over what the content element costs.

7. The method of claim 1, further comprising
   rendering the plurality of content elements from at least one of text, audio, music, and video source files at specific choreographed times within a virtual setting.

8. A system for procedurally generating live experiences for a 3-D virtualized music world, the system comprising:
   a headless content management system to provide management of a back end;
   a virtual world client to connect to the back end using an interface that provides a content packaging framework to enable customized event scheduling and destination management,
   wherein the virtual-world client procedurally generates a plurality of content elements in a real-time game engine for live experiences in a virtualized music-themed world.

9. The system of claim 8, wherein the virtual-world client comprises
   a server-side controller which provides server-side control over how the plurality of content elements is rendered.

10. The system of claim 9, wherein the server-side control comprises control over which content element of the plurality of content elements is rendered.

11. The system of claim 9, wherein the server-side control comprises control over where the content element is rendered.

12. The system of claim 9, wherein the server-side control comprises control over when the content element is rendered and for how long.

13. The system of claim 9, wherein the server-side control comprises control over what the content element costs.

14. The system of claim 8, wherein the virtual-world client renders the plurality of content elements from at least one of text, audio, music, and video source files at specific choreographed times within a virtual setting.

15. A non-transitory computer-readable storage medium storing a computer program to procedurally generate live experiences for a virtualized music-themed world, the computer program comprising executable instructions that cause a computer to:
   provide a headless content management system supporting management of back end;
   couple a virtual world client to the back end of the content management system using an interface that provides a content packaging framework to enable customized event scheduling and destination management; and
   procedurally generate a plurality of content elements in a real-time game engine for live experiences in the virtualized music-themed world.

16. The computer-readable storage medium of claim 15, wherein the executable instructions that cause the computer to procedurally generate comprises executable instructions that cause the computer to
   provide a server-side control over how the plurality of content elements is rendered.

17. The computer-readable storage medium of claim 16, wherein the server-side control comprises control over what content element is rendered.

18. The computer-readable storage medium of claim 1, further comprising executable instructions that cause the computer to
   render the plurality of content elements from at least one of text, audio, music, and video source files at specific choreographed times within a virtual setting.

* * * * *